United States Patent
Stanford

(10) Patent No.: US 7,011,273 B1
(45) Date of Patent: Mar. 14, 2006

(54) ORGANIZER CONSOLE

(76) Inventor: Larry A. Stanford, 1851 Myrta Dr., Wooster, OH (US) 44691

(*) Notice: Subject to any disclaimer, the term of this patent is extended or adjusted under 35 U.S.C. 154(b) by 0 days.

(21) Appl. No.: 10/805,127

(22) Filed: Mar. 19, 2004

Related U.S. Application Data

(60) Provisional application No. 60/456,062, filed on Mar. 19, 2003.

(51) Int. Cl.
*B60R 7/00* (2006.01)

(52) U.S. Cl. .................. 244/1 R; 244/118.1; 224/275; 296/24.34

(58) Field of Classification Search ........... 244/1 R, 244/118.1, 1, 118.5; 296/37.8, 37.15, 24.1, 296/400, 24.34; 312/7.2; 297/194; 224/42.42, 224/281, 902, 275
See application file for complete search history.

(56) References Cited

U.S. PATENT DOCUMENTS

| | | | | |
|---|---|---|---|---|
| 5,179,447 | A * | 1/1993 | Lain | 348/837 |
| 5,282,556 | A * | 2/1994 | Bossert | 224/540 |
| 6,254,160 | B1 * | 7/2001 | Marriott et al. | 296/24.3 |
| 6,811,197 | B1 * | 11/2004 | Grabowski et al. | 296/37.8 |
| 2001/0030436 | A1 * | 10/2001 | Kifer et al. | 296/24.1 |
| 2002/0175531 | A1 * | 11/2002 | Worrell et al. | 296/37.15 |
| 2003/0098589 | A1 * | 5/2003 | Wikman et al. | 296/24.1 |
| 2004/0217615 | A1 * | 11/2004 | Lindstrom et al. | 296/24.34 |

* cited by examiner

*Primary Examiner*—Galen Barefoot
(74) *Attorney, Agent, or Firm*—Nancy L. Reeves; Walker & Jocke

(57) ABSTRACT

A removable modular console adapted for use in a small aircraft which may be made in a plurality of sizes and configurations with selectively positionable internal walls, which may be further customized by attaching one or more of a variety of modules and accessories including armrests, clipboards, computer mounts, toolholders, oxygen tank holders, and emergency batteries to such removable modular console.

37 Claims, 25 Drawing Sheets

ORGANIZER CONSOLE

CROSS-REFERENCE TO RELATED APPLICATIONS

This application claims benefit pursuant to 35 U.S.C. § 119(e) of Provisional Application 60/456,062 filed Mar. 19, 2003.

TECHNICAL FIELD

This invention relates to consoles for organizing the tools and other materials which pilots of small aircrafts may be required to carry and have accessible during flight. Specifically, this invention relates to a removable modular console, suitable for use in a small aircraft, in a plurality of sizes and configurations with selectively positionable internal walls and a variety of modules and accessories including armrests, clipboards, computer mounts, toolholders, oxygen tank holders, and emergency batteries which may be attached to a console, thus facilitating the customization of each console to the pilot who will use it.

BACKGROUND ART

Pilots of small aircraft are generally required to carry with them a variety of items and information which must be accessible before, during, and after flight. Although the particulars may vary depending on jurisdiction, aircraft, and pilot certification, there are some common requirements for pilots of small aircraft. Generally, pilots are required to carry with them information about the specific aircraft the pilots are flying. Pilots are typically required to have access to such information before, during, and after the flight. This includes weight and balance information, and equipment lists. It generally also includes pilot operational handbooks or owners manual, and supplements thereto, which provide performance information and a plurality of checklists.

In addition, pilots are generally required to have access to, and to consult during flight, a variety of general flight information. Some of this information may be contained in a variety of charts or maps which include information about navigation, route, airspace, obstructions, communication and navigational radio frequencies, airport information, and scalable distances. Other information may be contained in an airport facility directory, which provides airport and taxi diagrams, runway information, air traffic control ("ATC") frequencies, navigational radio frequencies, and general airport information. Still more information may be contained in instrument approach plates for IFR flight plans, including such information as ATC frequencies, navigational radio frequencies and fixes, and detailed approach information. Finally, pilots are typically required to have access to general information on aircraft performance, weather, and other factors which may influence the pilot's ability to conduct a safe flight.

During flight the pilot is typically required to repeatedly review flight path and checkpoint information, track course and frequency changes, monitor the weather, copy clearances and read back instructions from the ATC, and to perform other tasks which require display and writing surfaces. Most small aircrafts do not provide any surface suitable for displaying maps or other navigational aids, or a stable writing surface, other than the copilot or passenger seat. It is not generally convenient for a pilot to consult maps or other navigational aids which are displayed on an adjacent seat, and doing so can contribute to spatial disorientation and pilot fatigue.

In addition to information, pilots are required to carry a number of tools. Generally, these tools include an oxygen tank, 2D flashlights, extra batteries, spare fuses, and a fire extinguisher. Pilots also typically carry a number of flight tools which supplement the mandatory hand-held or built-in tools, such as additional flashlights or emergency lighting and handheld communication or navigation devices.

Finally, pilots often carry a variety of other convenience items such as beverages, snacks, glasses, clipboards, scale rulers, calculators, timers, and pens. The items carried vary from pilot to pilot, as does the individual pilot's need to have each item accessible during flight. Thus no standard collection or arrangement of items is universally suitable.

Generally, small aircrafts do not contain built in storage which permits easy access to such items during flight. This often results in such items sitting loose in the cockpit or being stored in makeshift locations or in devices which are not designed for easy access during flight. For example, the fire extinguisher and/or oxygen tank are generally left loose on the floor, hanging off the back of a seat, under the pilot's seat, in the back of the aircraft, or in other relatively inaccessible locations.

In addition to the problem of organizing the information and tools for a single aircraft, a pilot may use more than one aircraft on a regular or irregular basis. When this is the case, all of the tools and information must be brought onto each new aircraft, organized in a perhaps less familiar cockpit, and removed at the end of the flight. This can result in tools or information being inadvertently left behind, in the flight being delayed while the pilot retrieves necessary tools or information, or in the pilot being unable to locate a tool or information at a crucial moment because of lack of familiarity with the current location of the tool or information.

An additional problem encountered by pilots of small aircraft is pilot fatigue. Particularly during long flights, it is important for the pilot to be able to shift into a variety of comfortable positions in order to avoid fatigue. The lack of a right pilot armrest in most small aircraft deprives the pilot of the ability to shift his or her weight to the right to minimize pilot fatigue. An additional contributing factor to pilot fatigue is the repeated need to compensate for work space inadequacies, such as inaccessible tools and the lack of a convenient writing and display space.

Finally, the cockpit in a small aircraft is generally small. Because of this, it is impractical to use multiple devices to function separately as an armrest, a desk, and an organizer.

Thus, there is a need for an organizer console designed specifically for small aircraft which is removable, to permit the pilot to assemble the contents ahead of flight with the particular items and arrangement customized to his or her own use. There is also a need for an organizer which can function not only as a an organizer, but also as a desk and as an armrest. In addition there is a need for an organizer which can be assembled to position the armrest, desk, and other accessories in a variety of positions to accommodate the different of needs different pilots, or of one pilot as he or she moves from one aircraft to another.

DISCLOSURE OF INVENTION

It is an object of an exemplary form of the present invention to provide a removable organizer console for use by pilots of small aircraft.

It is a further object of an exemplary form of the present invention to provide an organizer console which is modular and which can be fitted with a variety of modules or accessories.

It is a further object of an exemplary form of the present invention to provide a variety of modules or accessories for an organizer console.

It is a further object of an exemplary form of the present invention to provide an organizer console with a flexible internal structure.

It is a further object of an exemplary form of the present invention to provide an organizer console to which accessories can be attached in various configurations and locations.

It is a further object of an exemplary form of the present invention to provide an organizer console which serves as an organizer, armrest, and desk.

It is a further object of an exemplary form of the present invention to provide an organizer console which facilitates the organization of required information and tools for easy access by a small aircraft pilot before, during, and after flight.

It is a further object of an exemplary form of the present invention to provide an organizer which minimizes pilot fatigue by providing convenient and appropriate work surfaces and easy and certain access to tools, and by permitting the pilot to adjust the seating configurations.

It is a further object of an exemplary form of the present invention to provide an organizer console which permits a pilot to keep supplemental equipment and power sources easily accessible during flight.

Further objects of an exemplary form of the present invention will be made apparent in the following Best Modes for Carrying Out Invention and the appended claims.

The foregoing objects are accomplished in an exemplary embodiment of the invention by a removable modular organizer console adapted to fit adjacent to the pilot's seat in the cockpit of a small aircraft, and a variety of modules and accessories which can be attached to or incorporated in an organizer console. The organizer console may generally have the shape of a narrow box, open at the top. The interior of the organizer console may include a plurality of moveable internal walls to permit custom partitioning of the organizer console into a plurality of internal compartments. It may also contain an internal floor which may create a bottom compartment which may be equipped with latchable access doors at one or both ends of the compartment for the secure and accessible storage of an oxygen tank or fire extinguisher.

The organizer console may be equipped with one or more attachment parts to attach modules or accessories to the console, to permit the pilot to customize the organizer for his or her individual needs. Accessory modules may include an armrest, an armrest extension, a clipboard, a computer tray, emergency lights, back-up batteries, cupholders, pencil holders, and other items to which it may be advantageous to have ready access during fight. The means to attach the accessory modules may permit the pilot to selectively position the accessories and modules as well.

Because the console organizer is not fixed to the aircraft, the pilot may assemble and pack the organizer console before boarding the aircraft, and may remove it when the flight has ended.

BEST MODES FOR CARRYING OUT INVENTION

Figure 2:
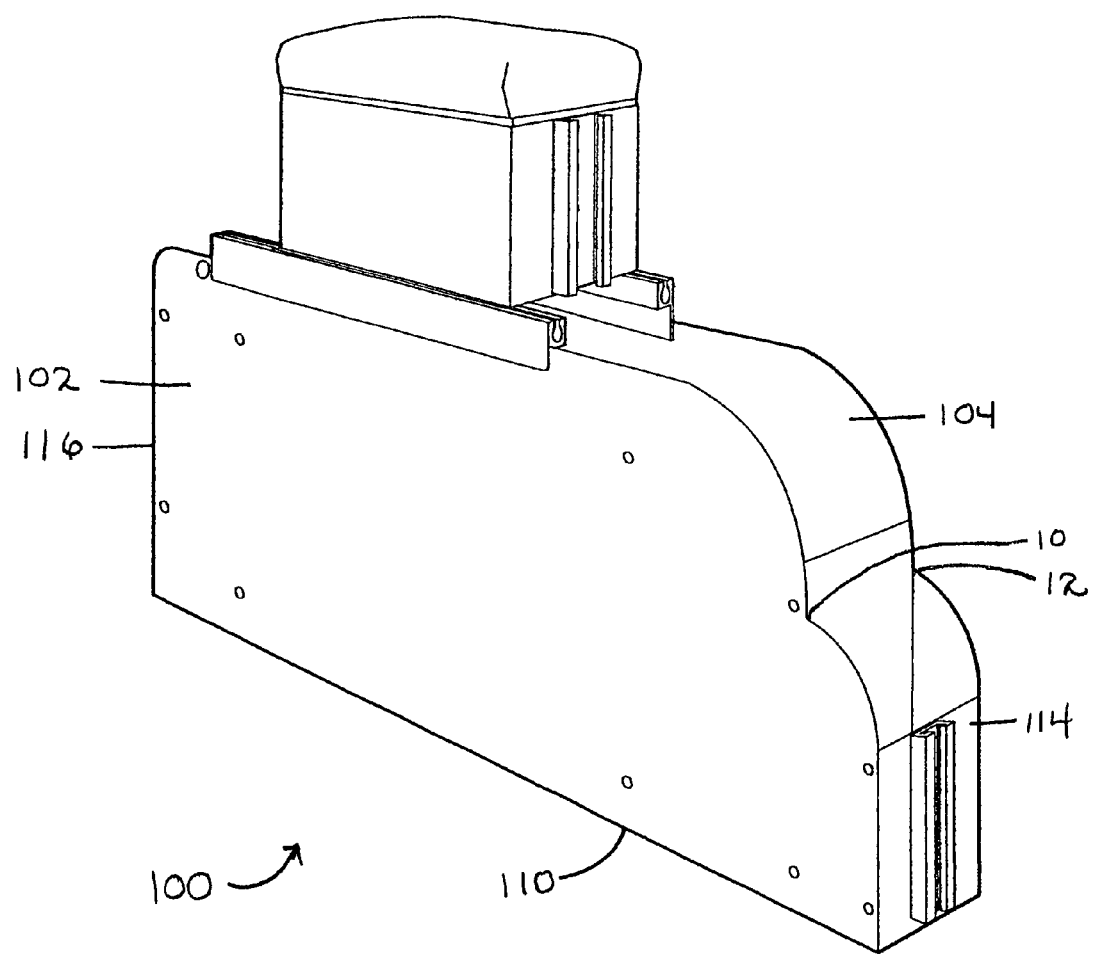
FIG. 2 is a perspective view of an organizer console without a bottom compartment.

Referring now to the drawings, and particularly to FIG. 2, there is shown therein an embodiment of an organizer console 100. An organizer console 100 may generally have the shape of an open box with first and second opposing sides 102 and 104, which are perpendicular to first and second opposing ends 114 and 116, which are all perpendicular to a bottom side 110. The first and second opposing sides 102, 104 may be identical and generally rectangular. In some embodiments, one right angle corner of the first and second sides 102, 104 may be inverted, with portions of the adjacent edges curving into the inverted corner creating a rounded step or scalloped shape, as illustrated at 10, 12 in FIG. 2. The first and second opposing ends 114, 116 may be generally rectangular, with a first end 114 shorter than a second end 116.

Figure 1:
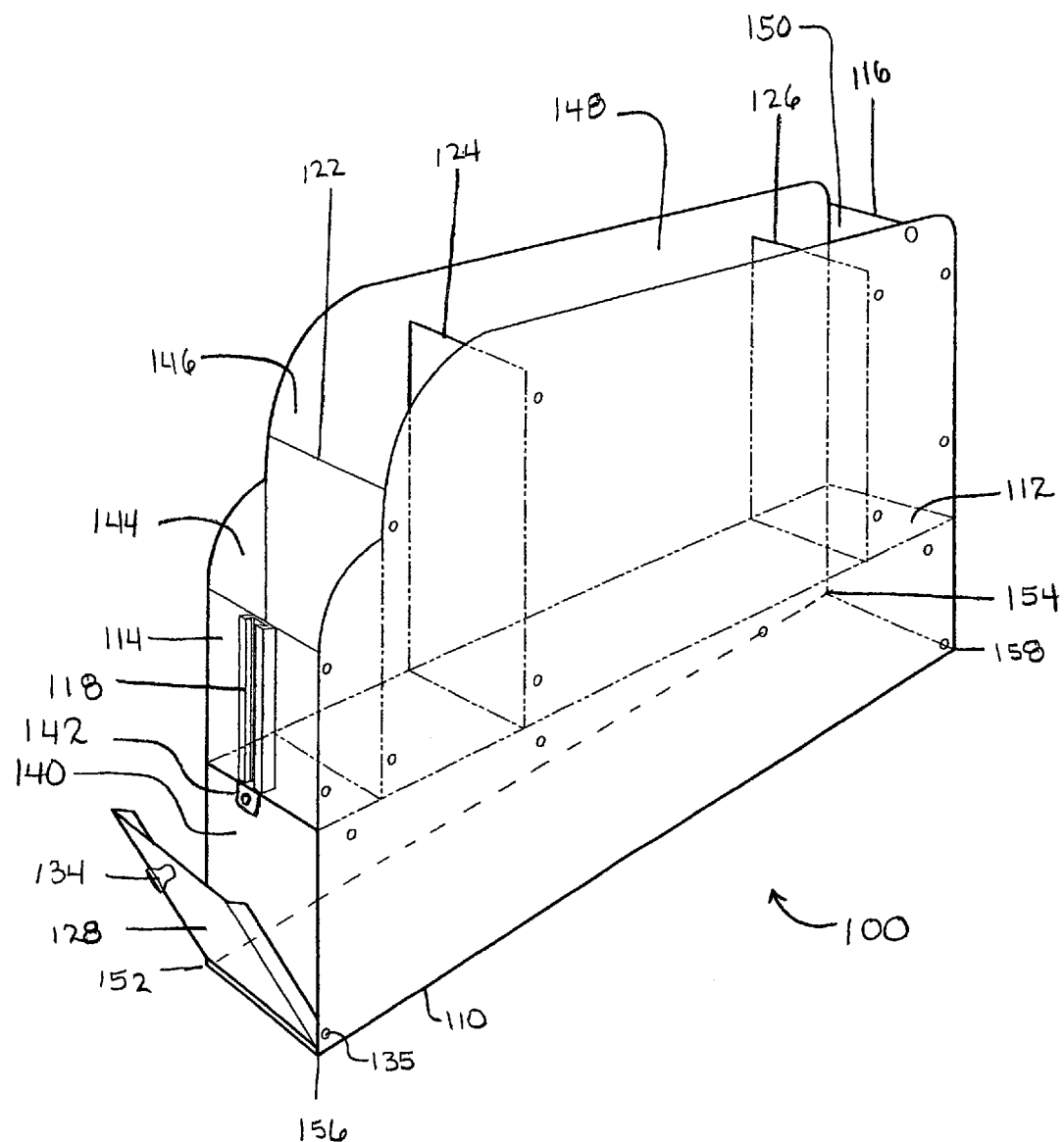
FIG. 1 is a perspective view of an organizer console with a bottom compartment, with the internal structure shown in phantom.

An organizer console 100 may contain a bottom compartment 140, which is suitable for storing essential items which are not always used, but which need to be easily accessible during flight, such as an oxygen tank or fire extinguisher, as illustrated in FIG. 1. The bottom compartment 140 may be formed by placing an internal floor 112 in the organizer console 100. As illustrated in the exemplary embodiment in FIG. 1, the internal floor 112 may be fixed in place. In other embodiments, the internal floor 112 may be attached by removable rivets, or other semi-permanent fasteners to permit removing, raising, or lowering the internal floor 112. The bottom compartment 140 of the organizer console 100 may be accessible by means of a first access door 128 contained in the portion of the first end 114 which is adjacent to the bottom side 110 of the organizer console 100. A second access door 130, which may be contained in the portion of the second end 116 which is adjacent to the bottom side 110 of the organizer console 100. Second access door 130 is not specifically shown in FIG. 1, but may be identical to first access door 128. An access door 128 may include a latching device, illustrated in FIG. 1 as a two-part latch denoted by reference numerals 134, 142 to permit the access doors 128, 130 to be fastened shut during use.

One or both of the access doors 128, 130 may also be removable. In the exemplary embodiment illustrated, first access door 128 is removably attached by means of removable rivets, one of which is illustrated and identified by reference numeral 135. In still other embodiments, the access doors may be removably attached by other means such as cotter pins, mating detents, or other means which are or may become known for attaching such doors at the hinge location. In other embodiments, access doors may be fixed to the organizer console 100. In further embodiments, access doors may not be hinged, but may be slidably inserted on tracks, or may be attached to a tray which slides into bottom compartment 140, one embodiment of which is described herein as an emergency battery module. Other embodiments may include other access door variations which permit the bottom compartment 140 to be closed at times, and open at other times.

In still other embodiments, the bottom compartment 140 may be customized to store a particular type of item. As one example, if an oxygen tank is to be stored in the bottom compartment 140, an access door 128 may be replaced by a control panel for the oxygen tank. In other embodiments the access door 128 may be left in place with a control panel installed on the inside of the access door 128 or on an accessible portion of inner wall of the bottom compartment 140. In other embodiments similar variations may be used to accommodate other items which may be stored in the bottom compartment.

An organizer console 100 may also contain first, second, and third internal walls 122, 124, and 126 which are generally parallel to the first and second ends 114, 116. In an exemplary embodiment illustrated in FIG. 1, one or more internal walls 122, 124, 126 may be fixed in position. In other embodiments, one or more internal walls 122, 124, 126 may be attached by removable rivets, stud and keyhole slots, or other semi-permanent fasteners which permit the user to move, remove, or add internal walls. The internal walls may create first, second, third, and fourth internal upper compartments 144, 146, 148, 150. Although in this embodiment there are three internal walls creating four compartments, in other embodiments there may be more or fewer internal walls creating more or fewer internal upper compartments. The first and second sides 102, 104 of the organizer console 100 may include a plurality of prefabricated holes for use in relocating internal walls 122, 124, or 126. In other embodiments the first and second sides 102, 104 may include only the holes for the initial placement of internal walls 122, 124, and 126, permitting the user to drill holes to precisely position internal walls 122, 124, and 126 in locations other than those permitted by the predrilled locations.

In the embodiment illustrated in FIG. 1, internal walls 124 and 126 are fixed in place by removable rivets. It should be understood that this embodiment is exemplary only and that these internal walls, and additional internal walls, may be fixed in place using non-removable rivets, bolts, welds, mating detents, studs and keyhole slots, or by other means that are or may become known for fixing internal walls to a box-like framework.

Figure 3:
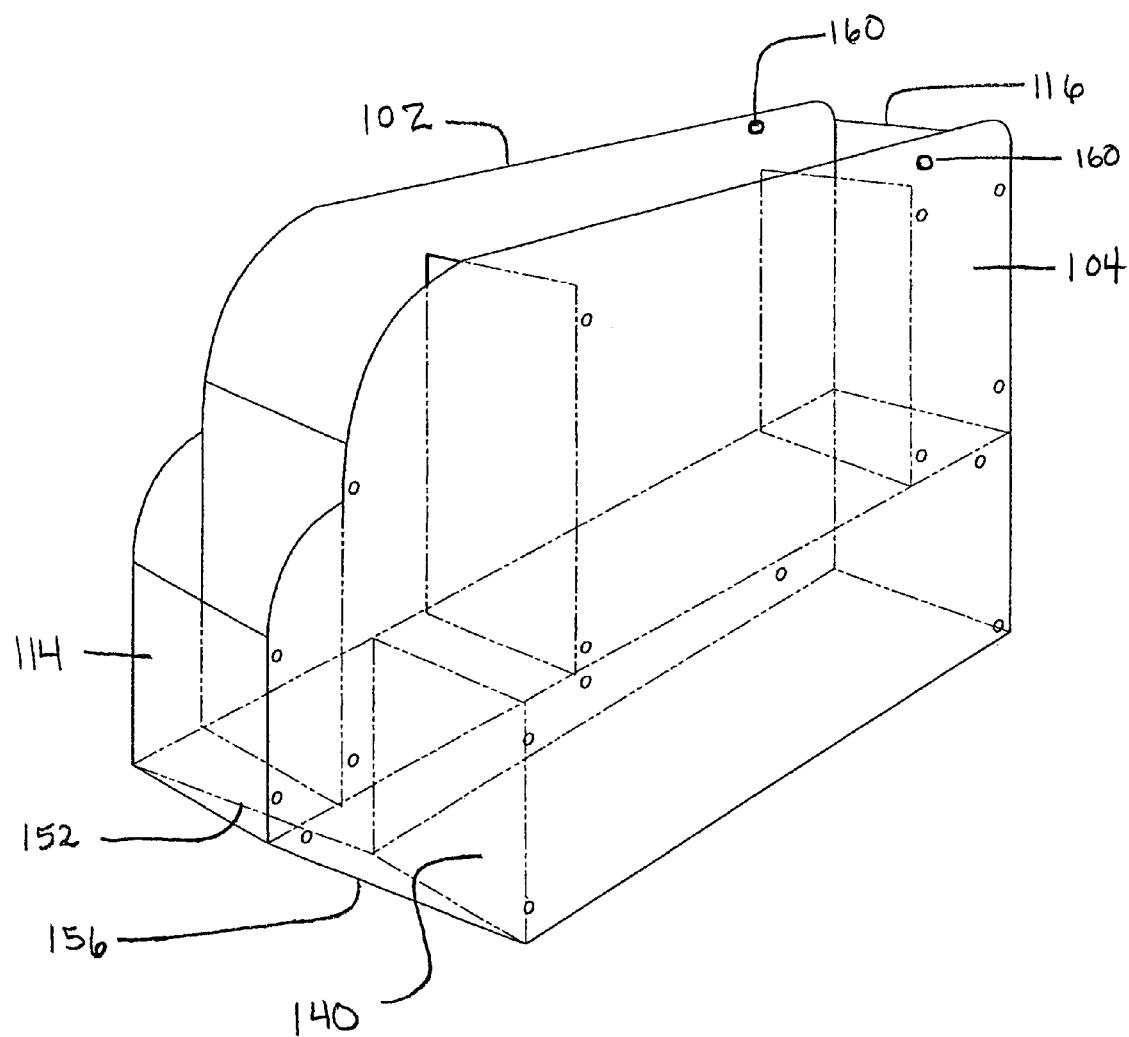
FIG. 3 is a perspective view of an organizer console with an angled front, with the internal structure shown in phantom.

The corners 152, 154, 156, and 158 of the first and second sides 102 and 104 which are adjacent to the bottom side 110 of an organizer console 100 may be right angle corners as illustrated in FIG. 1. In other embodiments, the corners 152, 156 of the first and second sides 102, 104 of the organizer console 100 which are adjacent to the first end 114 may be truncated, as illustrated in FIG. 3, to permit the organizer console 100 to better fit in cockpits in which the flat surface of the floor does not extend far enough forward to accommodate the full base of the organizer console 100. In some such embodiments, the bottom side 110 may be partially or entirely elevated within the organizer console 100. The internal structure of the organizer console 100 of FIG. 3 is shown in phantom in FIG. 3.

In an embodiment of organizer console 100 with a truncated corner, a bottom compartment 140 may have second access door 130 on a second end 116. In addition, a bottom compartment 140 may have a vertical, in the orientation illustrated, first access door 128, to a smaller bottom compartment 140, or may have an angled access door to a bottom compartment 140, or may have no access door on a first end 114.

Figure 4:
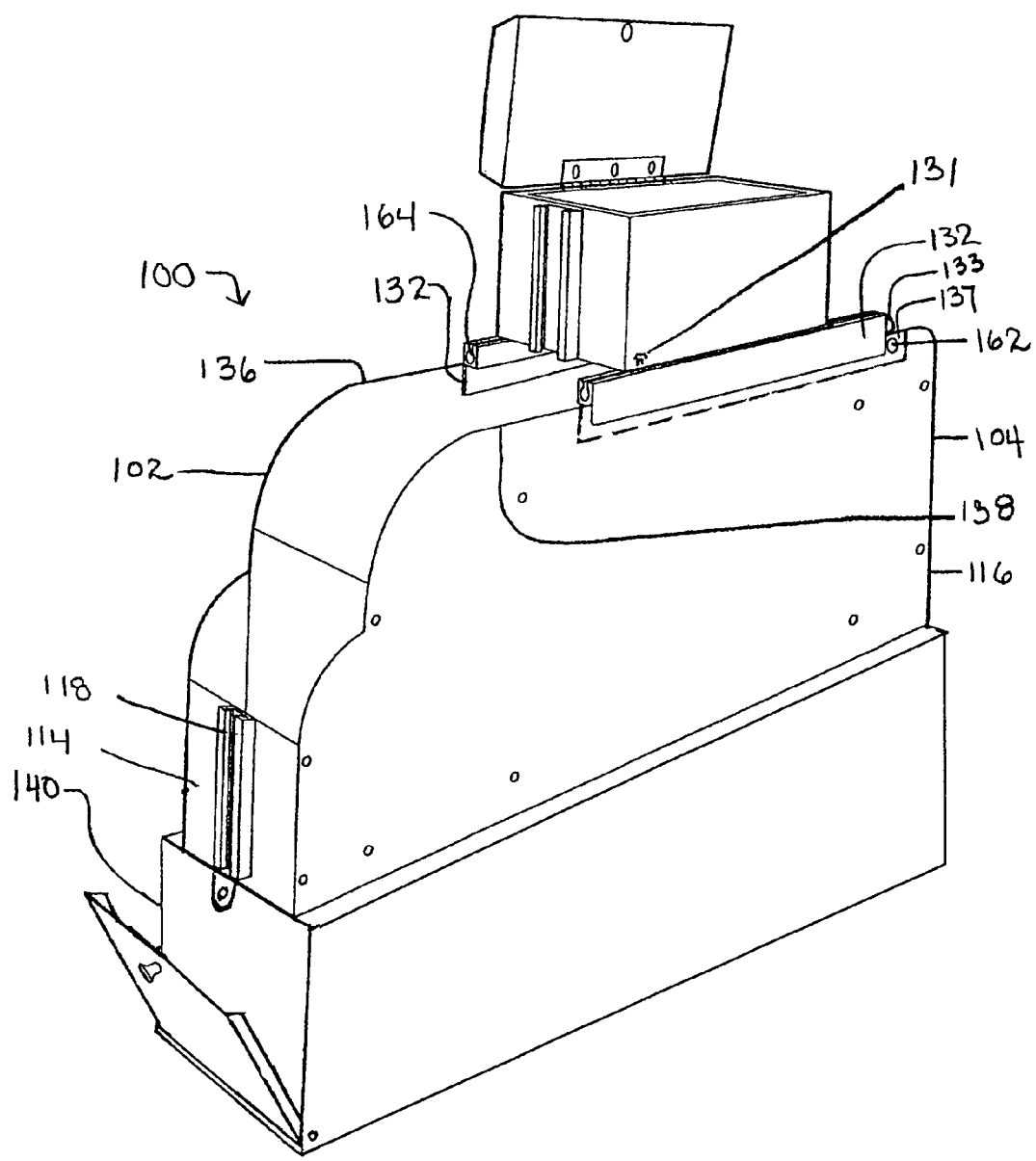
FIG. 4 is a perspective view of an organizer console having an inverted T shape with an attached open armrest.

In other embodiments, the floor space adjacent to the pilots seat may accommodate a wider base. In such circumstances, a console with the cross-section of an inverted T, as illustrated in FIG. 4, may be used. In the embodiment illustrated, the bottom compartment 140 may comprise the bar portion of the "T," which permits easy access to the entire bottom compartment. In an exemplary embodiment illustrated, a single access door permits access to the entire bottom compartment 140. In other embodiments, a smaller access door 128, or a plurality of access doors may be used to permit access to, or to secure the contents of, the bottom compartment 140. Similar access embodiments may be included on a second end 116. The bottom compartment 140 may comprise a single undivided compartment, or may be partitioned with fixed or removable partitions to permit segregated use of distinct portions of the bottom compartment.

Figure 25:
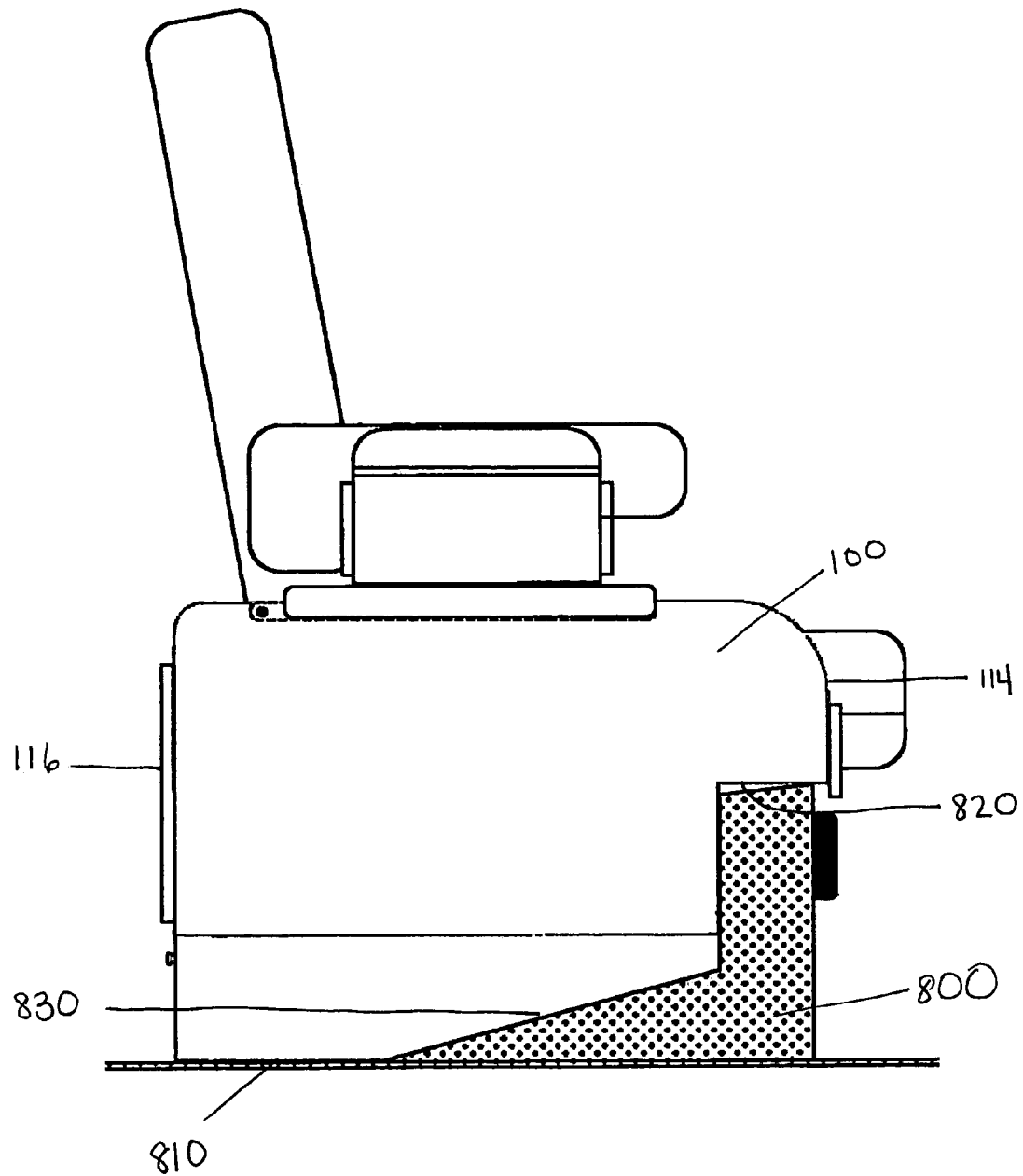
FIG. 25 is a side view of an exemplary organizer contoured to match the floor of an airplane cockpit.

In the exemplary embodiments discussed, three variations in the shape of the base of an organizer console are described. In other embodiments, other base shapes may be appropriate to conform to the contour of a cockpit floor in order to permit an organizer console to be securely seated in the cockpit of small aircraft having different floor structures. One such embodiment is illustrated in FIG. 25. On exemplary small airplane has a floor 800 which has a horizontal portion between the seats, an upward slope from the horizontal portion to a step near the front edge of the seats. The exemplary organizer console 100 illustrated in FIG. 25 has a base which includes horizontal portion 810, an upward slope 830 from the horizontal portion to a step 820, with the horizontal portion 810 adjacent the second end 116, comprising the bottom compartment 140 and the step 820, adjacent the first end 114, adapted to rest on the step on the floor 800 of the cockpit, as illustrated in FIG. 25. Such variations in base shapes, and others that may be appropriate to conform to specific floor contours, are within the scope of the organizer console embodiments discussed herein.

In the exemplary embodiments discussed, the organizer console is completely unattached to the structure of aircraft, and may be freely moved into, within, or taken out of the cockpit of the aircraft. In other embodiments, it may be desirable to permit the customized organizer console to be attached to the floor of the cockpit on a temporary or permanent basis. In an exemplary embodiment this may be accomplished by means of hook and loop tape placed on the bottom of the organizer console and, if necessary, on the floor of the aircraft. In other embodiments it may be accomplished by the use of bolts passed through the floor of the organizer console, or by any other means which is known or which may become known to attach a boxlike structure to the floor of a small aircraft.

Figure 13:
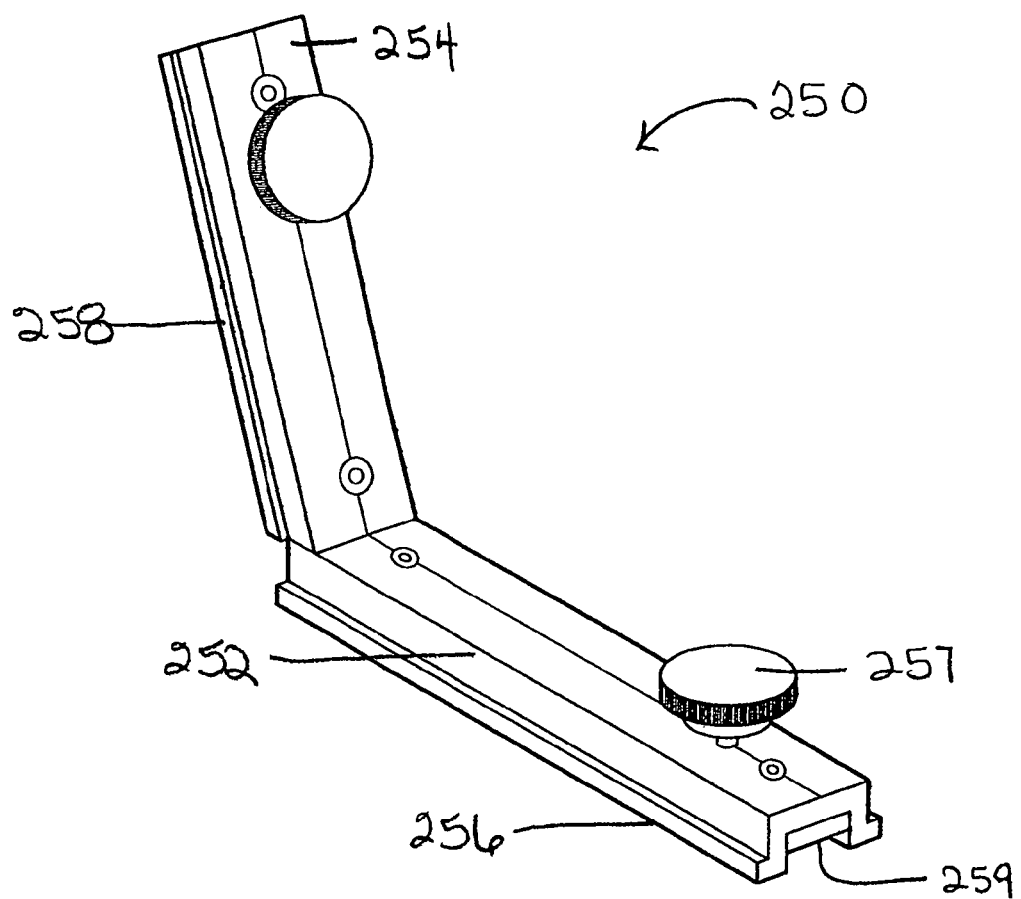
FIG. 13 is a perspective view of a mounting bracket.

An exemplary embodiment of an organizer console 100 may include one or more attachment parts fixed to the exterior of the organizer console 100 to permit the user of the organizer console 100 to attach various accessories or modules to the organizer console 100. One embodiment of a first attachment part 118 is illustrated in FIG. 4 on the first end 114 of the organizer console 100. In the exemplary embodiment illustrated, the first attachment part 118 comprises a track, the internal cross section of which resembles a T. Such a track is adapted to accept a generally T-shaped rail, generically referred to as a second attachment part. A second attachment part 256 of the type adapted to mate with the first attachment part 118 is illustrated in FIG. 13. A second attachment part 256 of the type illustrated in FIG. 13 often includes a tension screw 257, and may include a tension plate 259, to fix the second attachment part 256 in a selected relationship to the first attachment part 118. In other embodiments, however, the second attachment part may not include a tension screw or plate, but instead may rely on a stop near one end of the track of a first attachment part 118 or rail of a second attachment part 256, spring pins and detents, or other means to retain the console, module, or accessories in the proper relation to one another.

Although in the exemplary embodiments illustrated, the first attachment part 118 comprises a track with a T-shaped cross section, for use with a rail having a T-shaped cross section, in other embodiments first and second attachment parts may comprise tracks and rails with different cross sectional shapes. Although the first and second attachment parts may be interchangeable, in exemplary embodiments discussed herein generally one or the other is described as being attached to the console, modules, or accessories. Unless a particular type of attachment part is dictated by the relation between the parts being connected, or the use to which the console, accessory, or module may be put, the designation of a particular attachment part is made for illustrative purposes only.

As a specific example, a mounting bracket 250 illustrated in FIG. 13 is described as having a second attachment part 256 on the first leg 252. The attachment part is designated as a second attachment part 256 because such a mounting bracket 250 may be used to attach a clipboard to the console. In such a configuration it might be more practical to have a tension screw on the underside of the first leg 252 of the mounting bracket 250 than on the upper surface of the clipboard, which might interfere with using the clipboard as a writing surface. However, there may be configurations in which a tension screw would be more appropriately placed on the module, console, or attachment part than on the mounting bracket. In still other embodiments, different means of attaching modules or accessories to the console or to other modules may be used, such as hook and loop tape, studs and keyhole slot, bolts and holes, or magnets. In some embodiments, once the optimum configuration is selected it may be desirable to fix the accessories or modules in position by welding, adhesives, rivets, or other permanent means of attachment.

The exemplary embodiment of an organizer console 100 illustrated in FIG. 1 includes a first attachment part 118 on a first end 114 and a first attachment part 120 on a second end 116 (not shown). In an exemplary embodiment a first attachment part 120 is longer than first attachment part 118. In other embodiments, first attachment part 118 may be longer than, or equal to first attachment part 120. In still other embodiments, only one of the first and second ends 114, 116 may have attachment parts, or either the first or second ends 114, 116 may have more than one first attachment part. In further embodiments, one or both of the first and second sides 102, 104 may include attachment parts.

Figure 22:
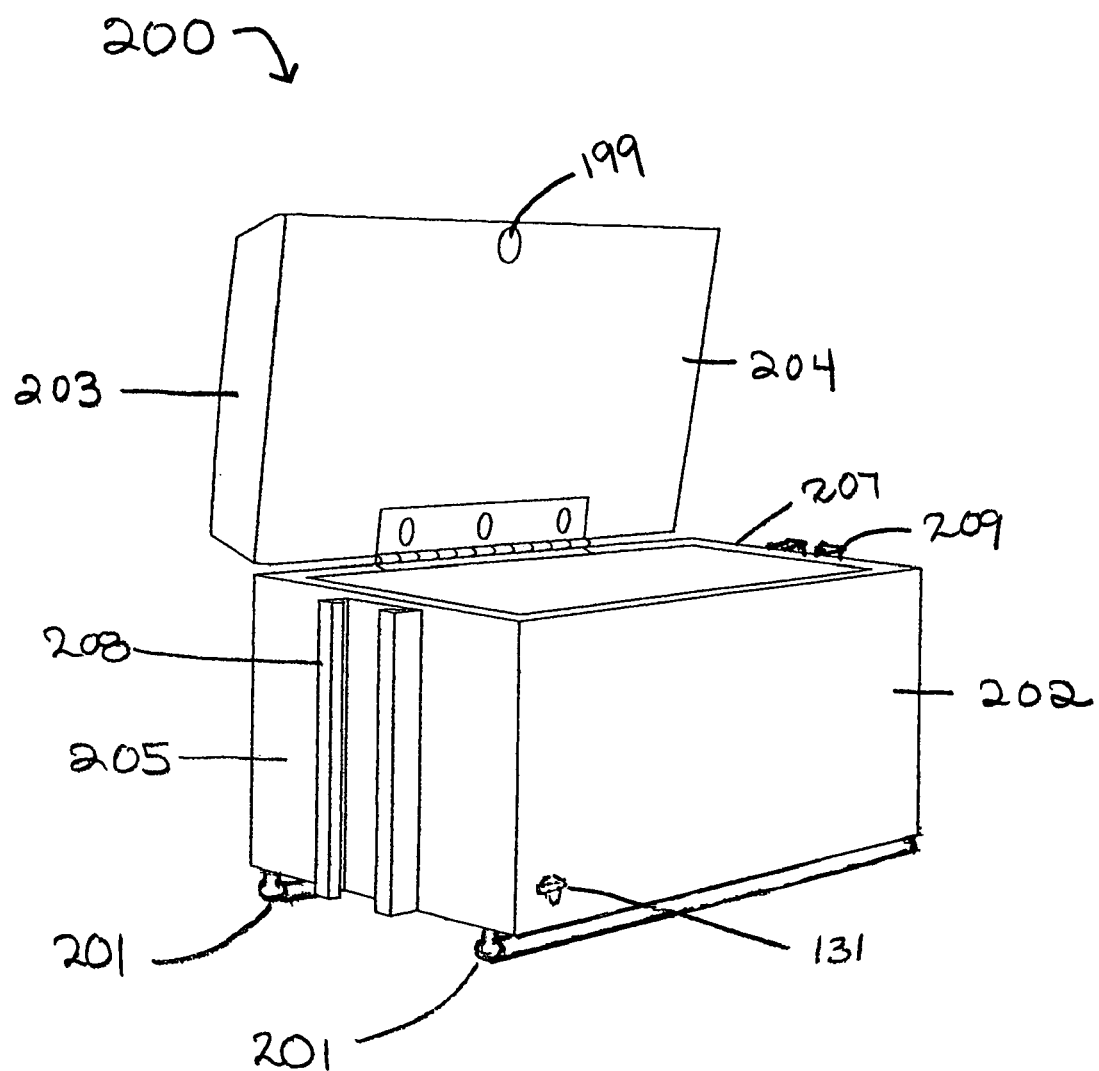
FIG. 22 is a perspective view of an armrest.

In addition, an organizer console 100 may include a means for attaching an accessory or module to the open top of the organizer console 100. In the exemplary embodiment illustrated in FIG. 4, the organizer console 100 includes two attachment rails 132. Attachment rails 132 are rails, the lower surface of which is adapted to rest on the upper edge 136, 138 of the first or second side 102, 104 of the organizer console 100. In the embodiment illustrated, the upper surface of each rail 132 comprises a track 164 which is adapted to mate with a rail 201 which may be fixed to a surface of an accessory module, as is illustrated in FIG. 22, which is discussed in more detail below. A rail 132 may have a length somewhat less than the corresponding length of the first or second side 102, 104 on which the rail 132 is adapted to rest. The inner portion of a rail 132 may include a finger-like projection 137 on the end of the rail 132 which will be placed adjacent to the second end 116 of the organizer console, as may be seen in phantom in FIG. 4. Each rail 132 may be attached to a first or second side 102, 104, near the upper edge 136, 138 adjacent to the second end 116, of the organizer console 100 by a pin, removable rivet, or other fastener 162 which passes through the upper edges 136, 138 of the organizer console 100 and through the projection 137 on the end of the rail 132. This relationship permits the rail 132 to pivot on the projection 137 at a pivot point 160 (illustrated in FIG. 3) near the upper edge 136, 138 of the first or second side 102, 104.

One or more tension screws 131, as illustrated in phantom in FIG. 4, may pass through the floor of an armrest module and press against the upper surface of a rail 132, adjacent the track 164. The screws are adapted to create friction when the rail 201 moves relative to the track 164 in rail 132, to prevent inadvertent movement of rail 201 relative to the track 164 in rail 132. In an exemplary embodiment, the composition of the tension screws 131 is nylon. In other embodiments, they may be formed of other materials which are slightly deformable and create friction when the surface pressed against by the material is moved relative to the material.

In the exemplary embodiment illustrated in FIGS. 4 and 22, the mating portions of the track 164 and rail 201 have generally circular cross sections, with track 164 forming the upper surface of rail 132, in the orientation illustrated in FIGS. 4 and 22. Rail 201 forms the lower surface of an attachment part to an accessory module, in the orientation illustrated in FIG. 22. In other embodiments, the mating portions may be reversed. In still other embodiments, the mating portions may have different cross sectional shapes so long as the two portions mate and permit the accessory to be fixed in a plurality of positions along the upper edges 136, 138 of the organizer console 100.

In the exemplary embodiment illustrated, a rail 132 may have a stop 133 attached to the end near the fastener 162 to limit the angle through which a rail 132 may be pivoted. In other embodiments, other means such as a chain stop, a stop attached to the console, or other means which are known or become known may be incorporated to prevent over extension of the rail hinge.

Various accessories or modules may be attached to an organizer console 100 to customize the organizer console 100 to the needs of an individual pilot. Exemplary accessories or modules are illustrated in FIGS. 9 through 24. Exemplary configurations of an organizer console 100 with attached accessories or modules are illustrated in FIGS. 4 through 8.

Figure 9:
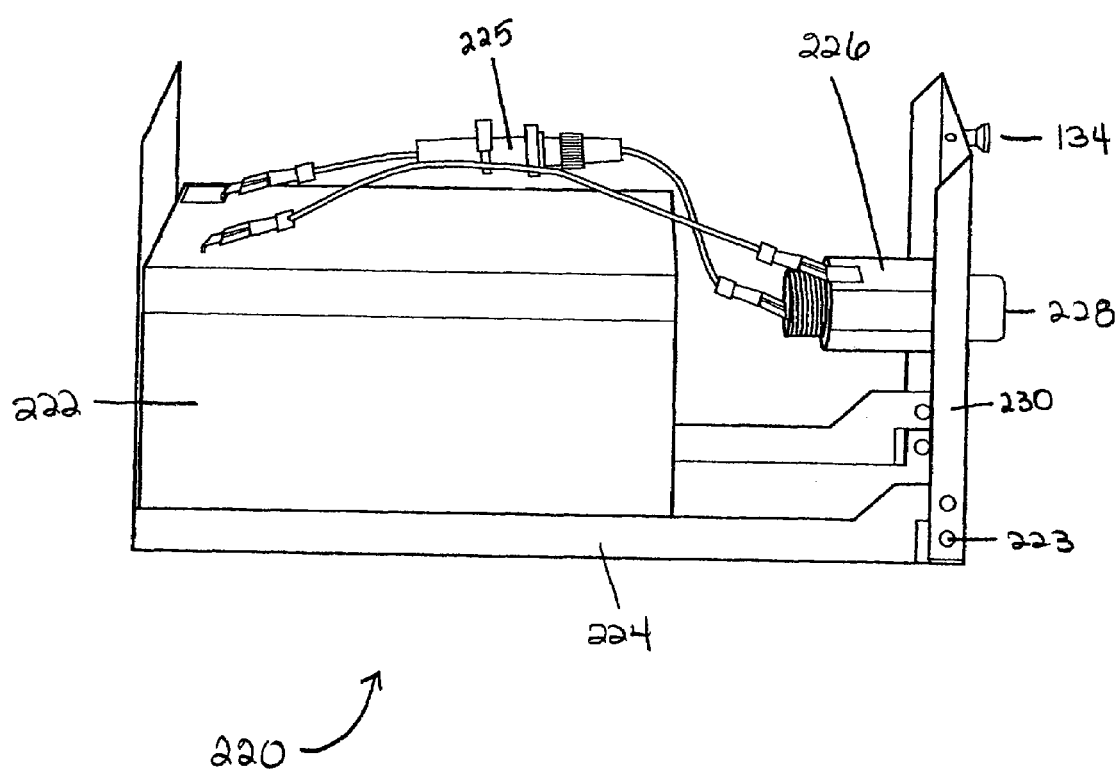
FIG. 9 is a perspective view of a back-up battery module.
Figure 10:
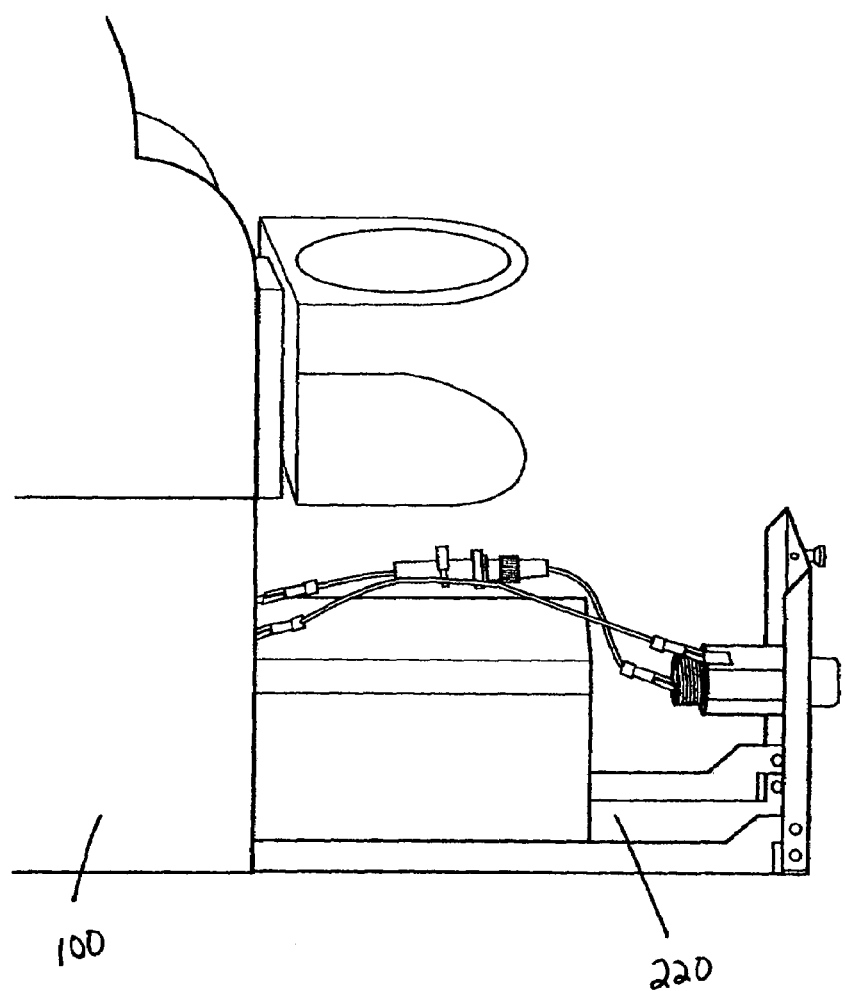
FIG. 10 is a perspective view of the back-up battery module of FIG. 8 inserted into the bottom compartment of a console organizer.
Figure 11:
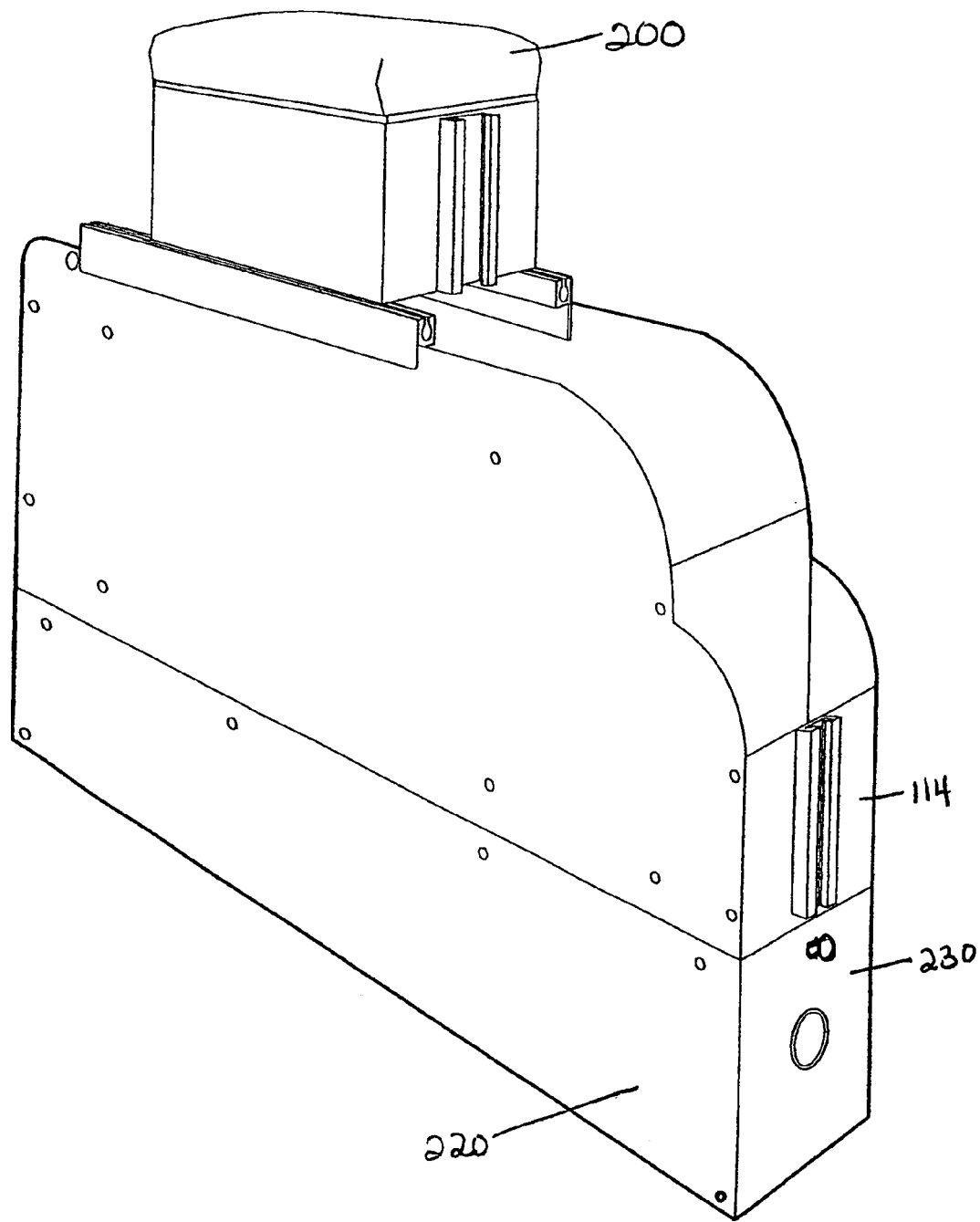
FIG. 11 is a perspective view of the organizer console of FIG. 1 with an attached armrest and back-up battery module, with the back-up battery port visible.

An emergency battery module 220 is illustrated in FIGS. 9 through 11. As illustrated in FIG. 9, a battery 222 is operatively connected to a cigarette lighter type power jack 226. The operative connection may include in-line fuse protection 225. In the exemplary embodiment illustrated, the battery 222 is a 12 volt sealed lead acid battery. In other embodiments, a different battery may be more appropriate, such as a dry battery, gel cell, or a non-sealed lead acid battery of the same or different voltage, and in-line fuse protection may not be included. The battery 222 may be placed in a generally U-shaped carrier 224, with a front panel 230 which is the same size as a first access door 128. The front panel 230 may further resemble the first access door 128 by including both holes for removable rivets 223 and a latch 134. The front panel 230 may contain an access port such as a power jack 226, which may be covered by power jack cover 228. In other embodiments, the carrier 224 may be L-shaped, having a tray on which the battery rests and a front panel 230. In this exemplary embodiment, access to the battery is provided by means of a 12 volt convenience outlet in the form of cigarette lighter type power jack. In other embodiments, access to the battery may be provided by other means, such as an outlet bearing a shape adapted for a particular electronic device, or through a different access port.

One embodiment of an armrest module 200 is illustrated in FIG. 22. The exemplary embodiment illustrated in FIG. 22 comprises a generally rectangular box 202 with a hinged lid 204 which is covered with a padded surface 203, which may be used as an armrest. In the exemplary embodiment illustrated, the lid 204 is hinged on the side which will be opposite the pilot when the armrest module 200 is attached to an organizer console 100 as illustrated in FIG. 4. This arrangement permits the lid 204 to open away from the pilot for easy access to the contents of the box 202. As will be appreciated, a box 202 of an exemplary armrest module 200 provides an easily accessible storage compartment for tools or other items which may need to be accessed during flight. In some embodiments, the box 202 may include a magnet 199 and plate, or other fastener means, which may be used to keep the lid closed. In other embodiments, the lid 204 may be hinged on a different side, or may be fixed to the box 202. In still other embodiments, the padded surface 203 may be supported by a pedestal or other means or may be positioned directly on the upper edges 136, 138 of the organizer console 100.

In the exemplary embodiment illustrated in FIG. 22, parallel rails 201 are attached to the bottom of the armrest module 200. In the exemplary embodiment illustrated and previously discussed, rails 201 have a generally circular cross section adapted to mate with and slide within the tracks 164 in rails 132 which may be attached to the upper edges 136, 138 of the organizer console 100. In the exemplary embodiment illustrated, the armrest module 200 is retained in position by friction. The friction is sufficient to hold an armrest module 200 in a selected position relative to an organizer console 100, but not sufficient to prevent a pilot from deliberately sliding the armrest module 200 to a different position along the rails. In an exemplary embodiment, the friction setting may be preset at the factory, but may be adjusted by the pilot over time by means of tightening of one or more tension screws 131 (shown in phantom) which may extend through the floor of the box 202 to press against the upper surface of a track 164.

As discussed above, the shape of the tracks and rails are exemplary, and other suitable shapes or configurations may be substituted for both the shape of the tracks and rails and braking mechanism. In one alternative embodiment, the mating portions may be on different surfaces of the rail 201 and attachment part. For example, the inner surface of rails 201 may include a T-shaped track which is adapted to mate with a T-shaped rail which is attached to the outer side of the attachment part on the underside of an armrest module 200, or may be included in both ends of a plate which extends across the underside of an armrest module 200. In an exemplary embodiment of this configuration, a tension screw may be used to press down through the floor of an armrest module on a T-shaped rail of this configuration, torqueing the T-shaped rail within the T-shaped track, creating sufficient friction to keep the armrest immobile unless deliberately moved.

Figure 8:
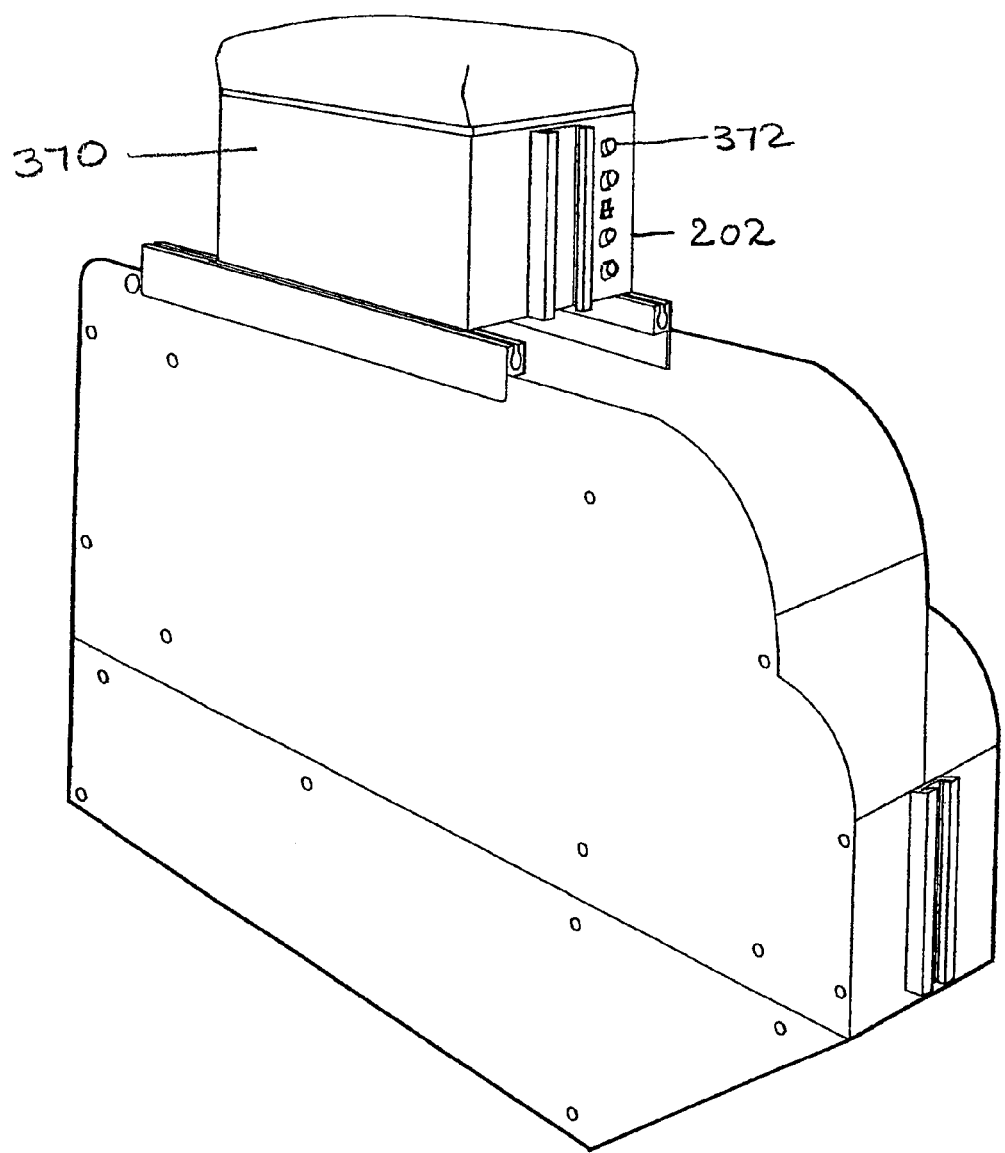
FIG. 8 is a perspective view of the organizer console of FIG. 3 with an attached armrest/LED light combination.

Another exemplary embodiment of an armrest module 370 is illustrated in FIG. 8. The exemplary embodiment illustrated in FIG. 8 includes LEDs 372 on one external surface of the box 202, which may be powered by batteries attached to the inner surface of the wall of the box 202 which includes the LEDs. Generally an armrest module 200 is interchangeable with an armrest module 370, and when the use of one type of armrest module is suggested, either type of armrest module may be used unless expressly precluded.

In the exemplary embodiment illustrated and previously discussed, an armrest module 200 may be attached to an organizer console by means of a hinged rail system, which permits the armrest module 200 to be pivoted about pivot points 160 on the upper edges 136, 138 of the first and second sides 102, 104 of an organizer console 100 to permit access to the interior of the organizer console 100. In other embodiments, an armrest module may be attached to an organizer console by different means. One such alternative embodiment might be an unhinged rail and track system which would permit the armrest module to slide back and forth to permit access to the interior of an organizer console. Another alternative embodiment might be for the bottom, in the orientation illustrated in FIG. 22, of the armrest module to have shape similar to a rectangular box lid to permit it to slip over the top of an organizer console. In still other embodiments, the pilot may choose to forego access to the interior of the organizer console by permanently fixing the armrest module to the organizer console by welding, permanent adhesive, or other means which are known or which may become known to permanently fix two objects together.

When attached to an organizer console 100, an armrest module 200 functions as part of the organizer console 100 to which it is attached, and may have additional accessories or modules attached directly to it. In order to permit the attachment of additional accessories or modules, first attachment parts may be fixed to one or more exterior sides of the armrest module 200. As illustrated in FIG. 22, two exemplary locations for the first attachment parts 208, 209 to be attached to the armrest module 200 are the first and second ends 205, 207 of the box 202 which correspond to first and second ends 114, 116 of the organizer console 100.

Figure 6:
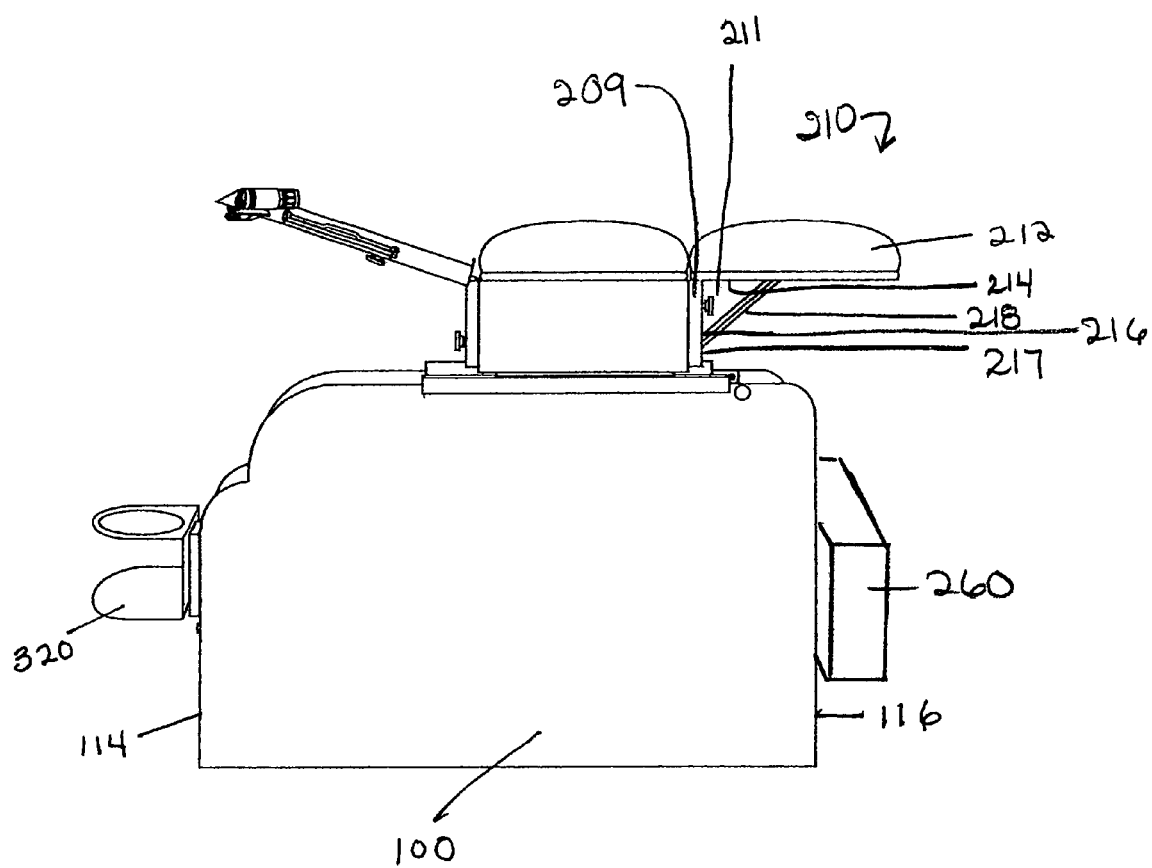
FIG. 6 is a perspective view of the console of FIG. 1 with an attached armrest, armrest extension, clipboard, flashlight, single cupholder, and CD box.

Because a single armrest may not provide sufficient surface area for a pilot's needs, an additional armrest extension module 210 may be used, as illustrated in FIG. 6. An armrest extension module 210 may include an armrest portion 212, comprising a relatively flat surface covered with a cushioning material, which is mounted on a mounting bracket 211. A mounting bracket 211 may be generally L-shaped, with a diagonal brace 218 fixedly connected to the first and second legs 214, 216 of the bracket 211 to provide support. A first leg 214 of a mounting bracket 211 may be fixed to the underside of the armrest portion 212. A second leg 216 of the L-shaped bracket may incorporate a second attachment part 217 of the type suitable to mate with a first attachment part 209. In an alternative embodiment, the second leg 216 of an L-shaped bracket may include a plate of appropriate dimensions so that it can mate with a first attachment part without the need to attach a separate second attachment part.

In one exemplary embodiment discussed, an armrest portion is fixedly attached to one leg of the mounting bracket, and a second leg of the mounting bracket is connected to an armrest module by an adjustable track and rail attachment. In other embodiments, a second leg may be permanently attached to an armrest module. In alternative embodiments, both the first and second legs may have adjustable attachment parts to permit both horizontal and vertical adjustment, in relation to the position illustrated in FIG. 6. In still further embodiments, the need for an armrest extension may be alleviated by substituting a longer armrest module for the armrest module plus extension combination.

In addition to armrests, pilots may find a variety of other accessories useful to attach to an organizer console 100. Some exemplary accessories are described below, but many more may be added or substituted without departing from the scope of the embodiments of organizer consoles, modules, and accessories described herein. Generally, any item which is of a size that it is possible to attach to an organizer console may be fitted with a second attachment part and attached to the console at any location having a first attachment part. Other mating or non-mating attachment means may also be used, such as the clips which are used to attach the exemplary flashlight and penholder accessories as described below, or other means such as hook and loop tape or stud and keyhole slot. It should be understood that the particular exemplary accessories and modules described herein, and the means of attachment for each exemplary accessory or module, are exemplary only. Variations which are within the scope of the modules and accessories described herein will be apparent to those skilled in the art. The terms accessory and module, as used in this specification, are interchangeable.

Figure 12:
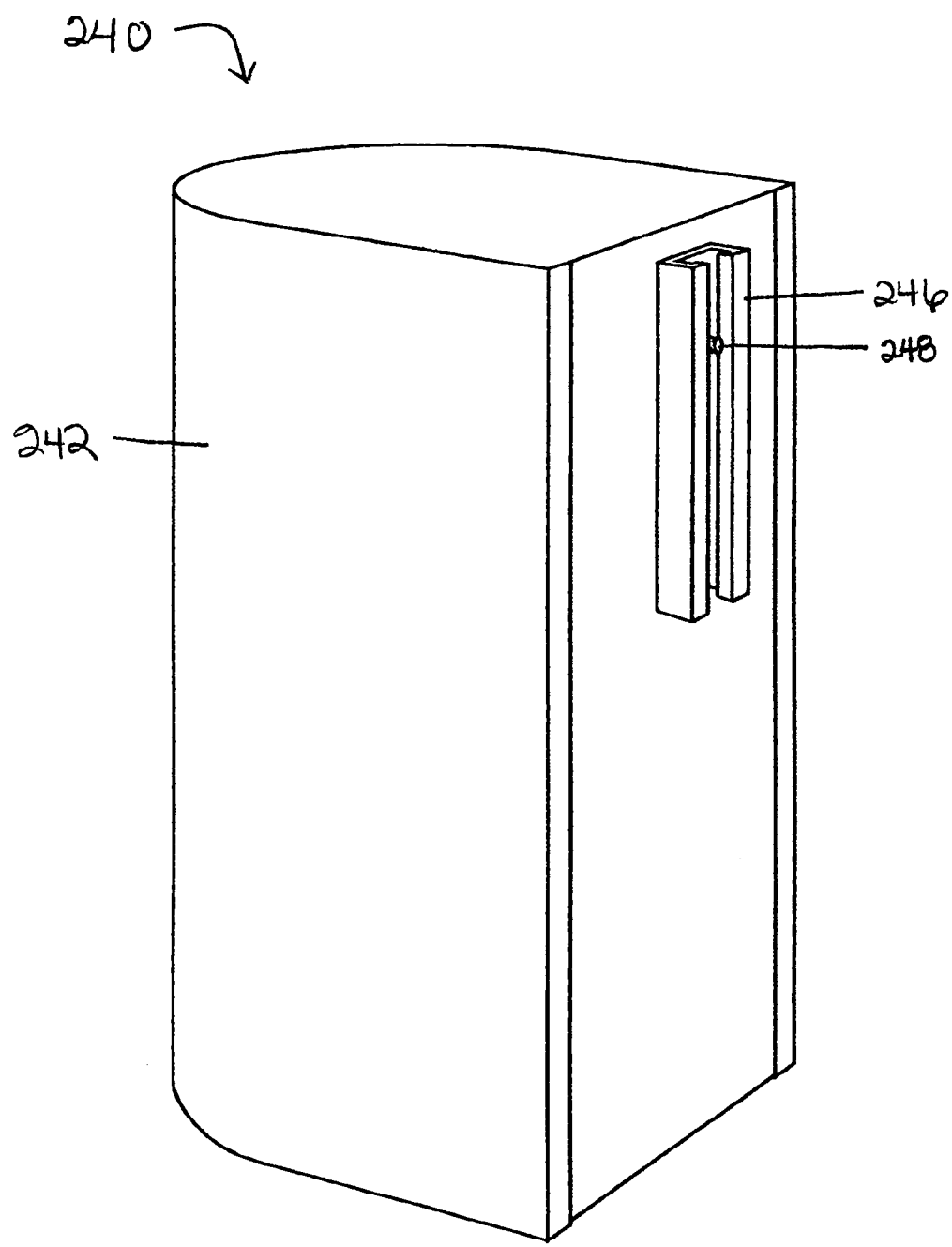
FIG. 12 is a perspective view of a wastebasket.

A wastebasket module 240 is illustrated in FIG. 12. In the exemplary embodiment illustrated, a wastebasket 242 comprises a generally cylindrical container, flattened on one side and open at one end. In the embodiment illustrated, a second attachment part 246 is fixed to the flattened side of the wastebasket 242. A tension screw 248 inside the wastebasket 242, the tip of which is illustrated in FIG. 12, may be used to fix the wastebasket 242 in the selected position relative to an organizer console or module to which it is attached. Although in the exemplary embodiment illustrated the wastebasket is generally cylindrical, in other embodiments the wastebasket may be shaped differently, such as rectangular, triangular, or otherwise, so long as the shape is adapted to temporarily retain waste.

It should be understood that in this exemplary module, and in others described below, the use of a tension screw, or a particular means of attachment or means to fix the relative position of the two items being attached, is exemplary. In other embodiments, a stop may be placed at the top of an attachment part instead of a tension screw. In still other embodiments different means of attachment such as studs and keyhole slots, loop and hook tape, or other semipermanent or permanent means of attachment may be used.

Figure 14:
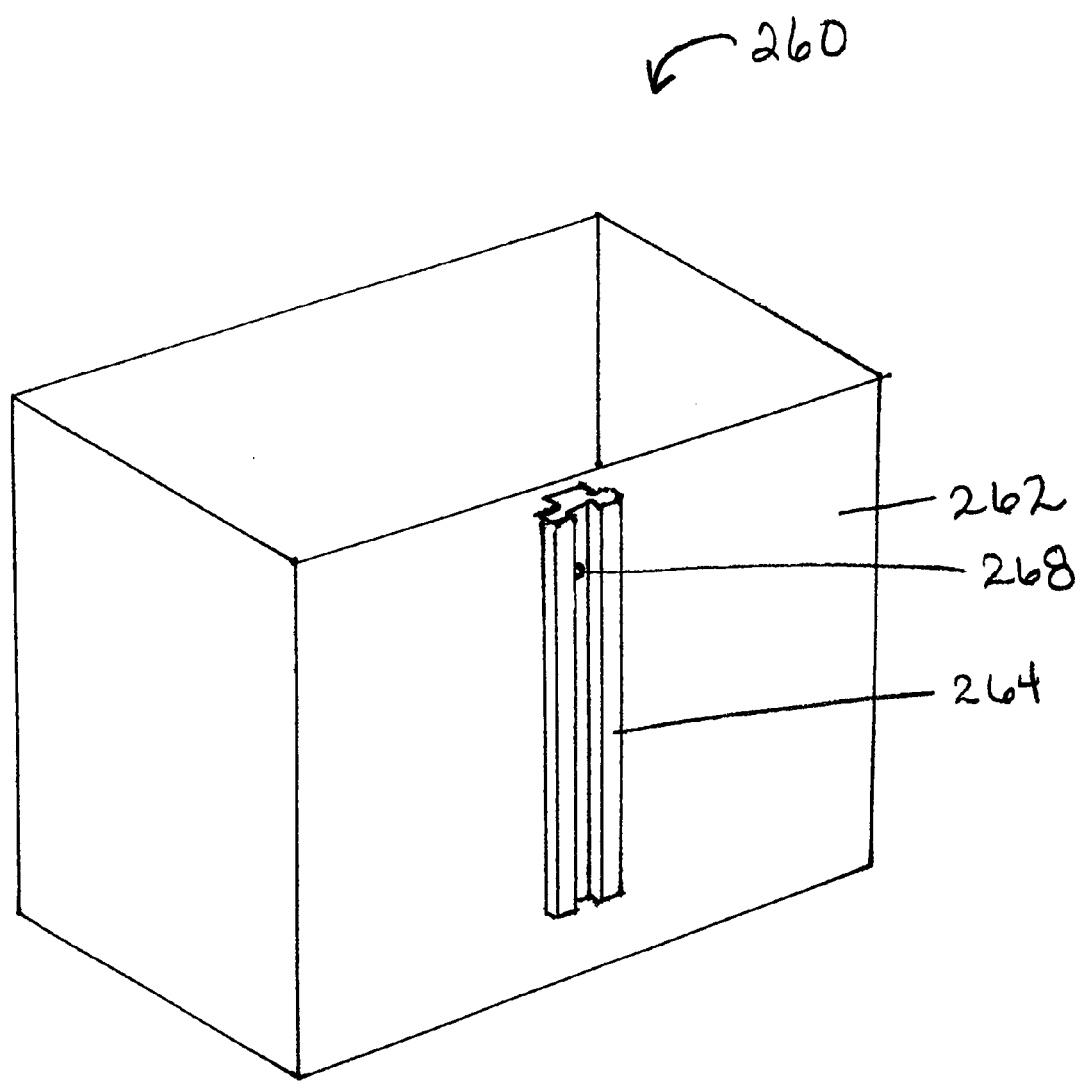
FIG. 14 is a perspective view of a CD box.

Another accessory, illustrated in FIG. 14, is a CD box module 260. The CD box module 260 comprises a small open rectangular CD box 262, with a second attachment part 264 fixed on one side. A tension screw 268 inside the CD box 262, the tip of which is illustrated in FIG. 14, may be used to fix the CD box module 260 in the selected position relative to an organizer console or module to which the CD box module 260 is attached.

Figure 21:
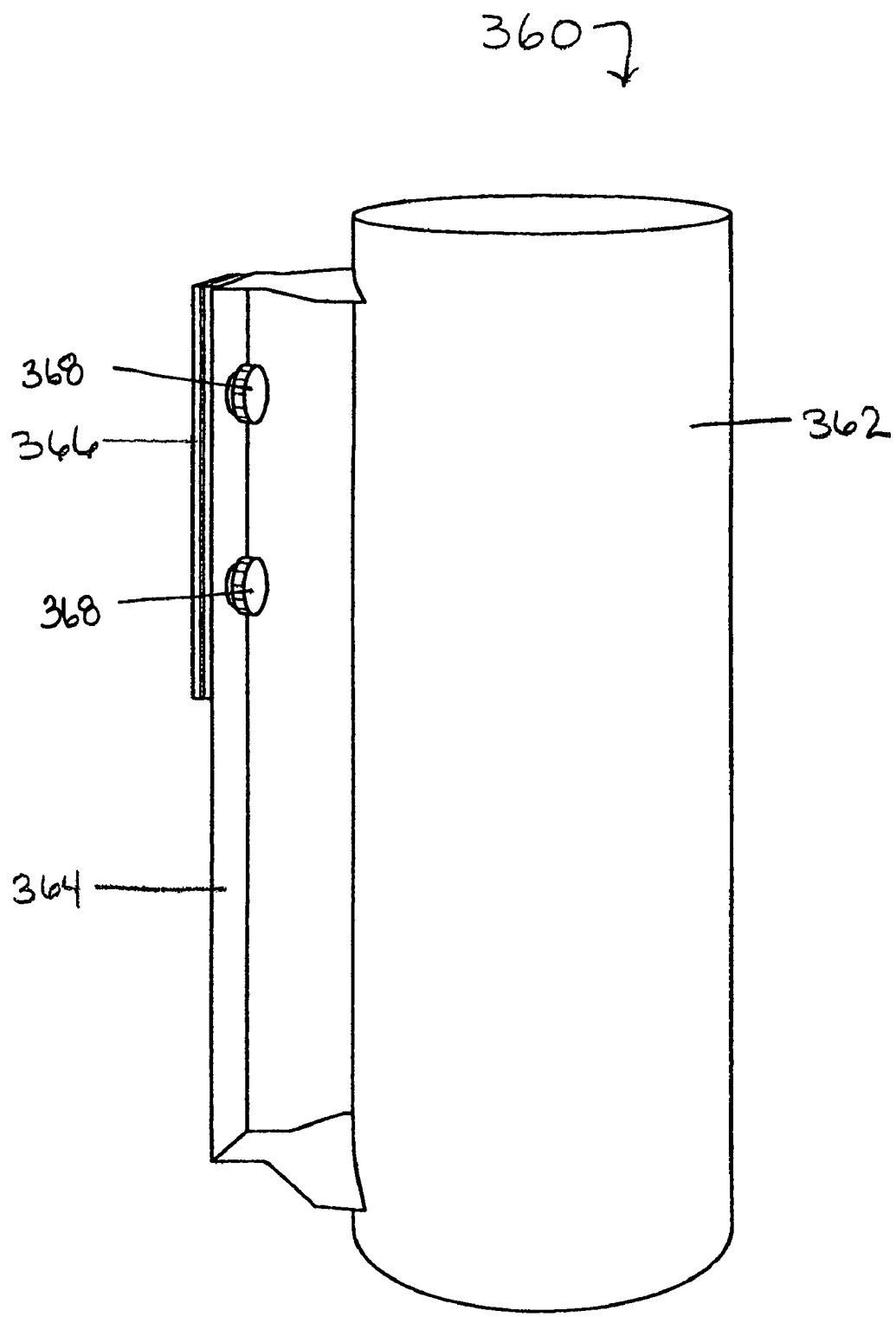
FIG. 21 is a perspective view of an oxygen tank holder.

An oxygen tank holder module 360, illustrated in FIG. 21, comprises a holding container 362 which is generally cylindrically shaped with an elongated U-shaped handle 364 extending most of the length of the holding container 362. A second attachment part 366 may be attached to the handle 364, or another suitable attachment site, to permit the oxygen tank holder module 360 to be attached to an organizer console 100. A second attachment part 366 may include one or more tension screws 368 to fix it in position relative to the organizer console 100 to which it is attached. Other embodiments may use different means to fix the position, such as a stop near the top of the second attachment part 366.

Figure 5:
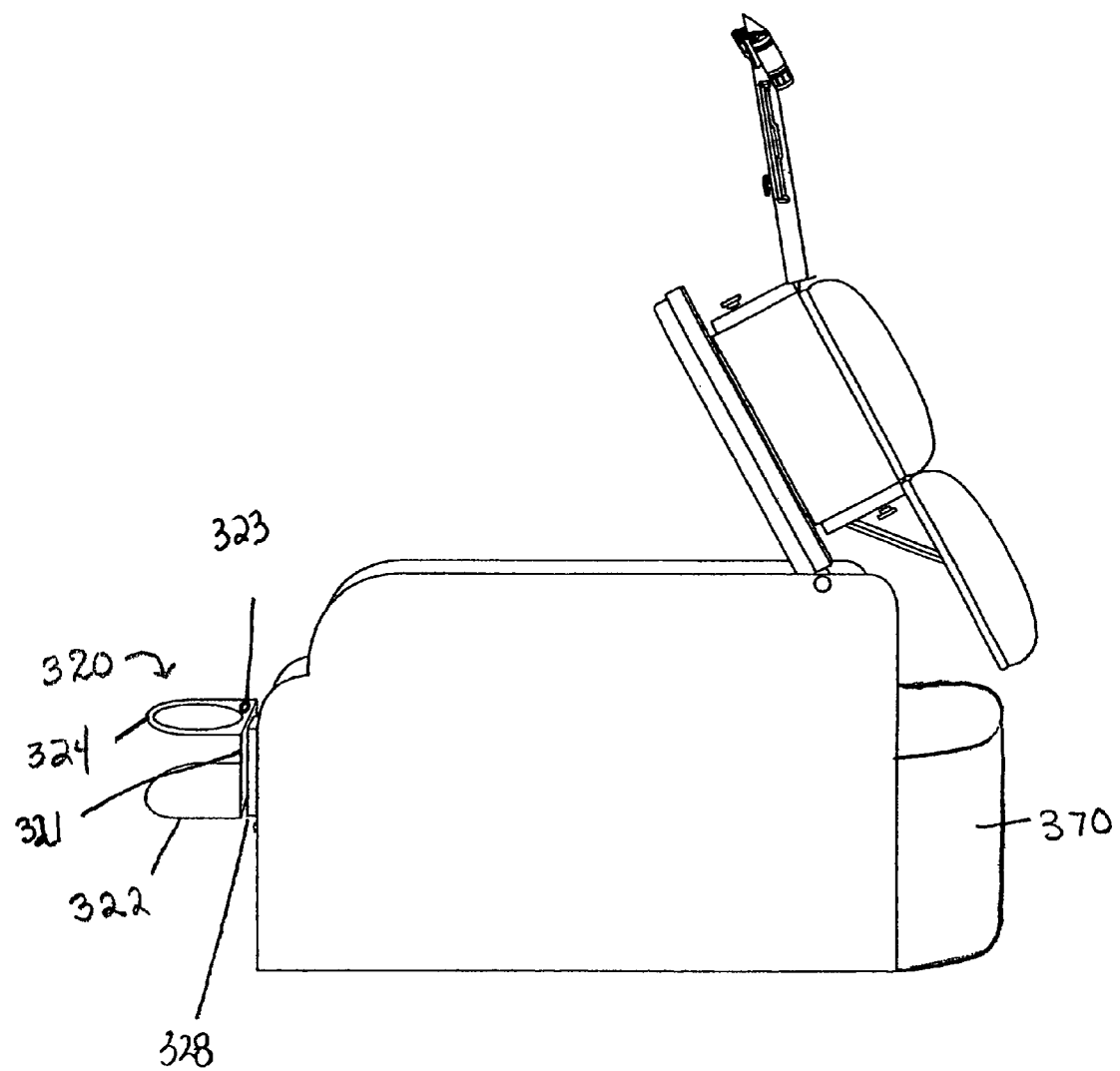
FIG. 5 is a perspective view of the organizer console of FIG. 1 with an attached armrest, armrest extension, single cupholder, and wastebasket, open to the main console compartment.
Figure 18:
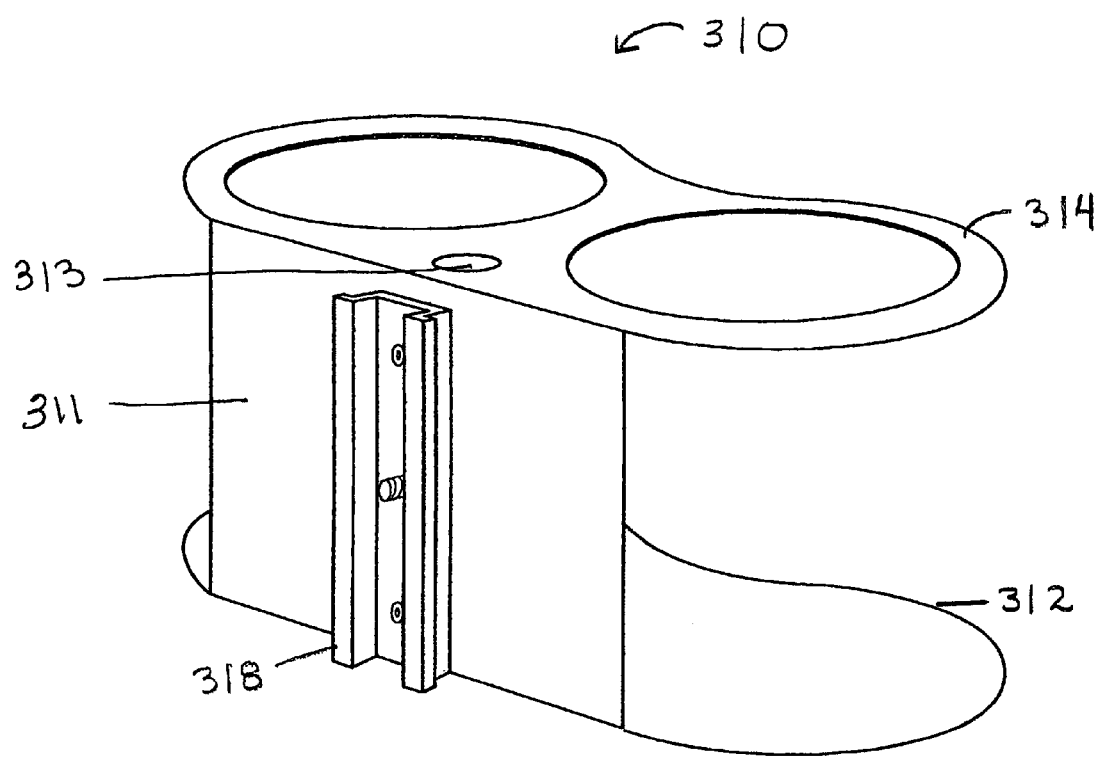
FIG. 18 is a perspective view of a double cupholder.

Single and double cup holder modules 320, 310 are illustrated in FIGS. 5 and 18. In the exemplary embodiments illustrated, the cupholders 321, 311 are generally U-shaped, with the lower leg of the U forming a solid shelf 322, 312 of a size suitable to support one or two cups. The surface of the upper leg of the U, comprising the holding portion 324, 314, may be generally circular for a single cupholder, as illustrated in FIG. 5, or figure 8-shaped, as illustrated in FIG. 18, for a double cup holder. The two legs of the cupholders 321, 311 may be connected by the base of the U, to which a second attachment part 328, 318 is fixed. A hole 323, 313 may be included in the upper surface of the cupholder 321, 311 to permit the attachment of a flexible GPS mount to the cupholder 321, 311. Although a particular cupholder shape is illustrated in this embodiment, cupholders are available in a variety of shapes, many of which are suitable for the purposes described herein and may be adapted with second attachment parts, or other means of attachment, to be attached to an organizer console 100, an armrest module 200, or another module or attachment bracket.

Figure 19:
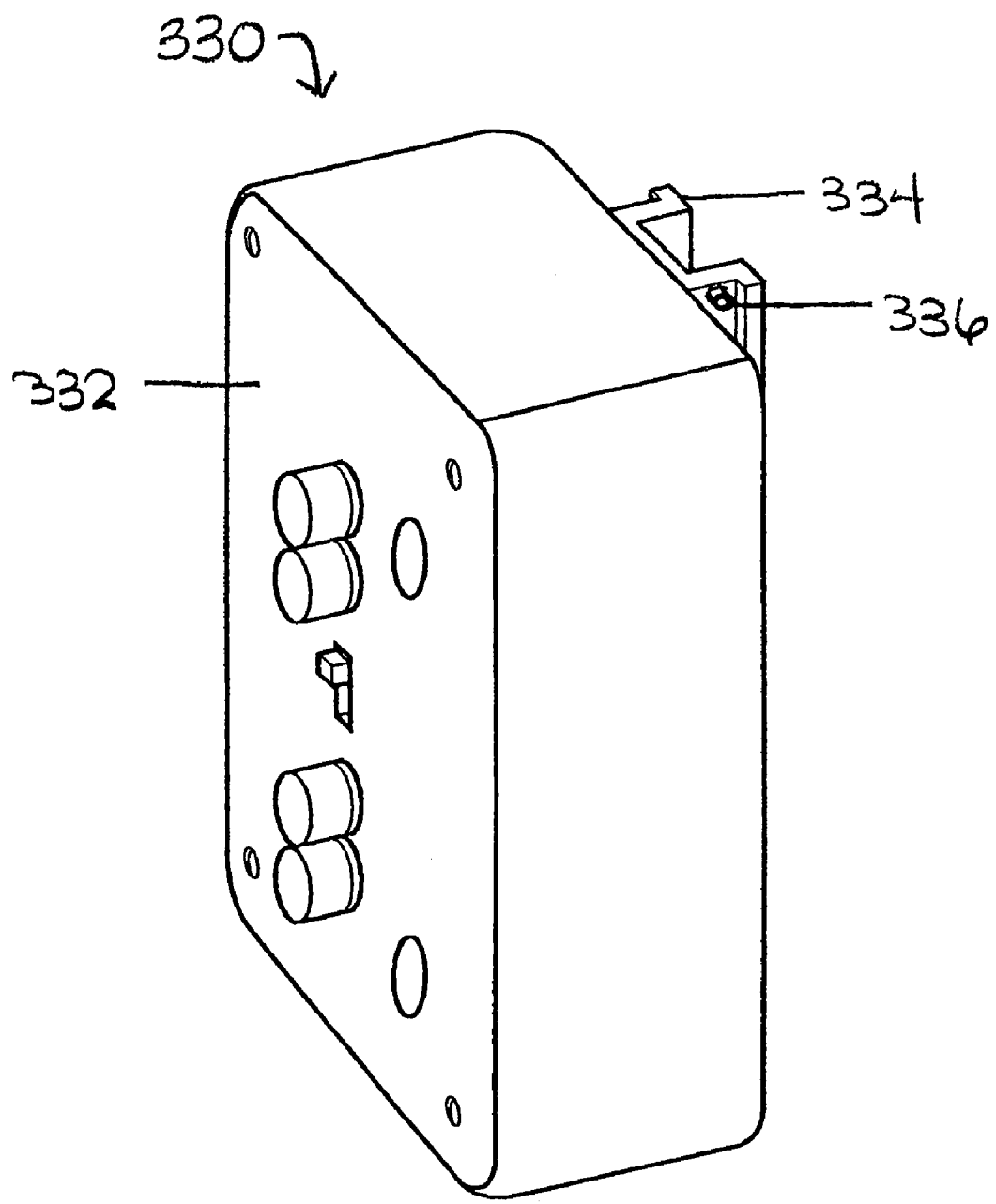
FIG. 19 is a perspective view of an emergency light.

Another accessory may be an emergency light module 330, as illustrated in FIG. 19. In the exemplary embodiment illustrated, a second attachment part 334, and a stop 336 at the upper end, as illustrated, of the second attachment part 334 is fixed to a small emergency light 332 to permit it to be attached to an organizer console 100. Many commercially available self-contained small emergency lights may be adapted for use as an emergency light module as described herein.

Some accessories may be more useful if mounted in locations other than directly on the body of the organizer console 100. A mounting bracket 250, illustrated in FIG. 13, may be used for this purpose. A mounting bracket 250 generally comprises first and second legs 252, 254 which meet to form an angle of generally ninety (90) degrees or more. As illustrated, an accessory attachment 256, 258 is fixed to each leg 252, 254 on the surfaces of the legs which form the exterior of the angle formed by legs 252, 254. As previously noted, the attachment parts are exemplary in nature, and substitutions of other suitable attachment parts may be made. Similarly, although in an exemplary embodiment the legs mounting bracket angle generally form a right or obtuse angle, in other embodiments it may be desirable for the legs of the mounting bracket to form an acute angle. A mounting bracket 250 may be used to support items which need to be raised above the level of the organizer console 100, or which need to be held at an angle for use or viewing, such as a clipboard or computer.

Figure 15:
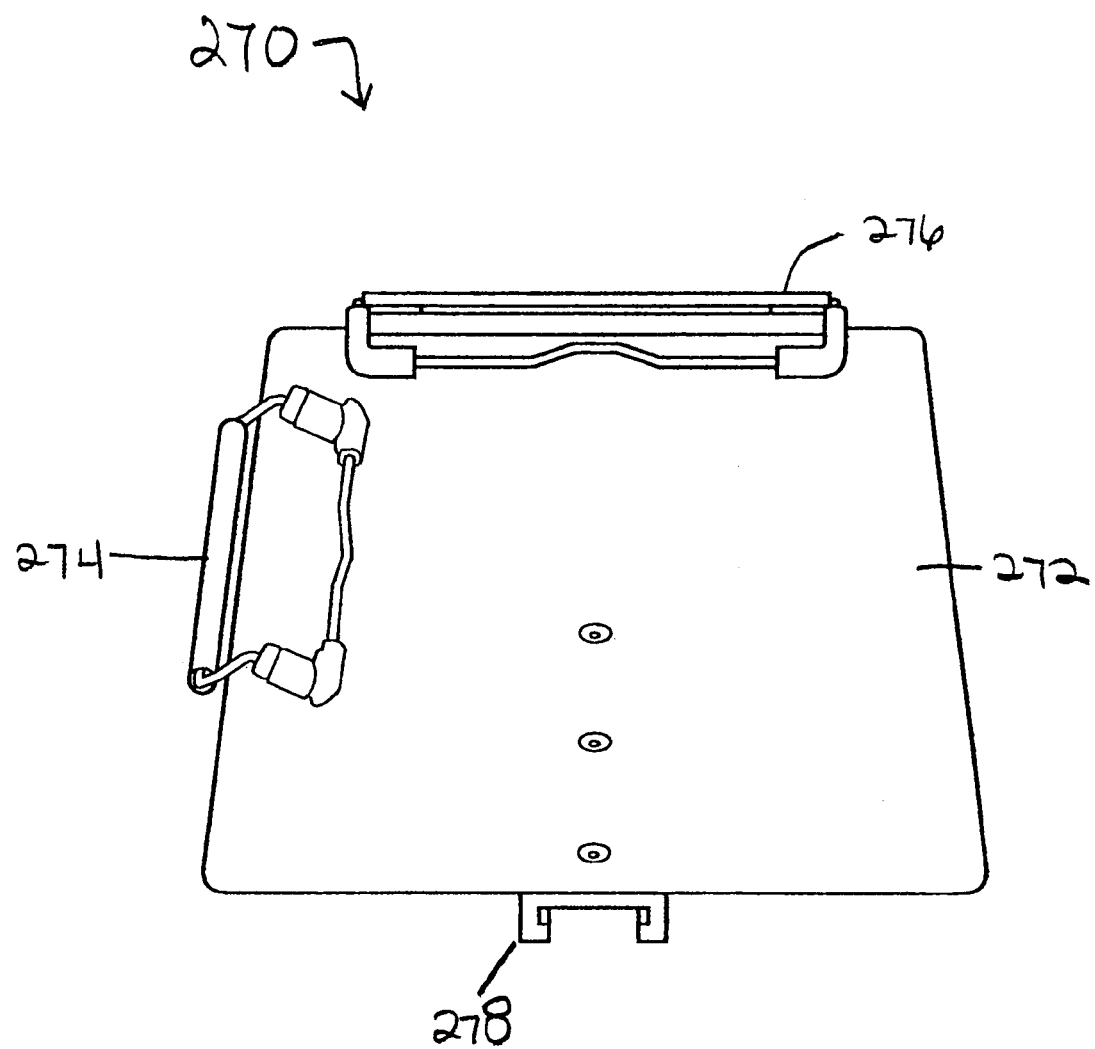
FIG. 15 is a perspective view of a clipboard.

An exemplary clipboard module 270 which may be attached an organizer console 100 using a mounting bracket 250 is illustrated in FIG. 15. In the exemplary embodiment illustrated, a first attachment part 278 is attached to the back of a clipboard 272, so that it can be attached to the second attachment part 256 on a mounting bracket 250. The clipboard illustrated includes a side clip 274 and a top clip 276. The clipboard 272 illustrated in FIG. 15 is exemplary in nature. A wide variety of clipboards are suitable for use in a clipboard module 270 so long as a first attachment part 278, or other means of attachment, can be fixed to the back side of the clipboard.

Figure 16:
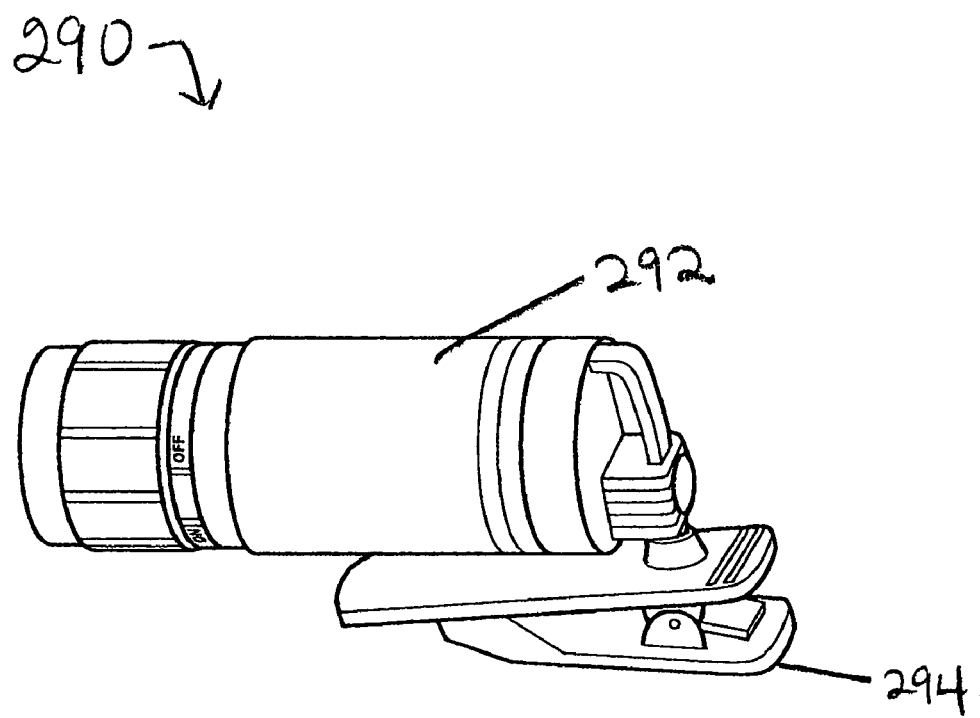
FIG. 16 is a perspective view of a flashlight.
Figure 17:
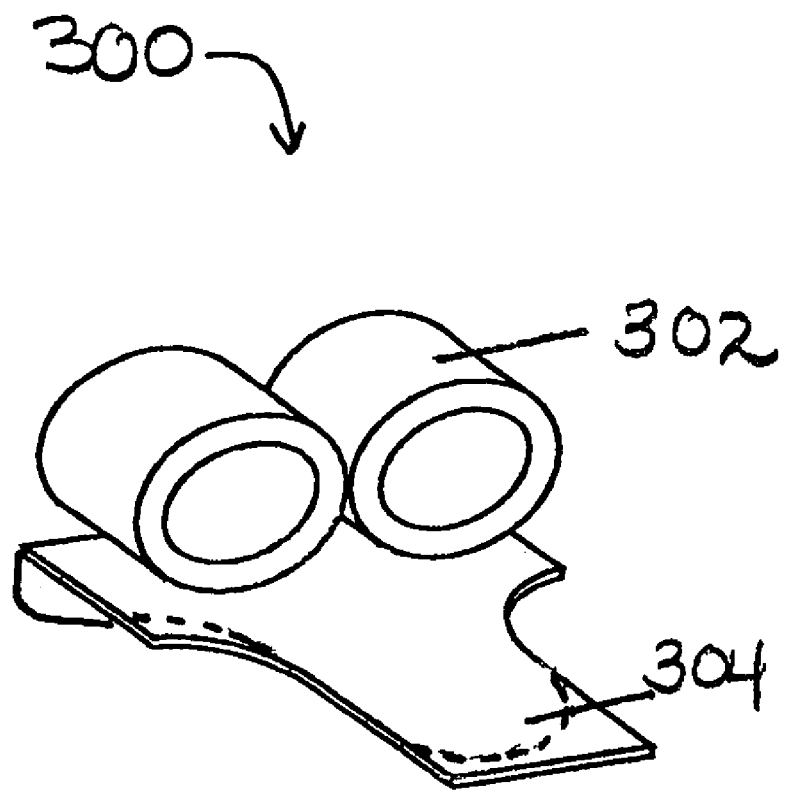
FIG. 17 is a perspective view of a double pen holder withe clip portion shown partially in phantom.

A variety of additional accessories may be attached to a clipboard module 270, two of which are illustrated. A penholder accessory 300 is illustrated in FIG. 17, and a flashlight accessory 290 is illustrated in FIG. 16. An exemplary embodiment of a penholder accessory 300 includes a double penholder 302, comprised of two connected cylindrical grips which may be attached to a clip 304, the back of which is shown in phantom. Clip 304 resembles and functions similarly to a money clip and may be slipped onto any edge of a clipboard 272, or onto an edge of an organizer console 100. Although in this exemplary embodiment a penholder 300 is adapted to hold two pens, in other embodiments it may be adapted to hold fewer or more pens. In addition, the embodiment illustrated is adapted to attach to the clipboard module 270 by means of a clip 304, in other embodiments other attaching means may be used such as an alligator clip, loop and hook tape, studs and keyhole slots, or magnets.

An exemplary embodiment of a flashlight accessory 290, as illustrated in FIG. 16, includes a flashlight 292 to which an alligator style clip 294 is attached. A variety of readily available flashlights are appropriate for use as an accessory, and a variety of other means of attachment may be used. Two additional exemplary means of attachment, for example, are hook and loop tape and magnets.

Figure 20:
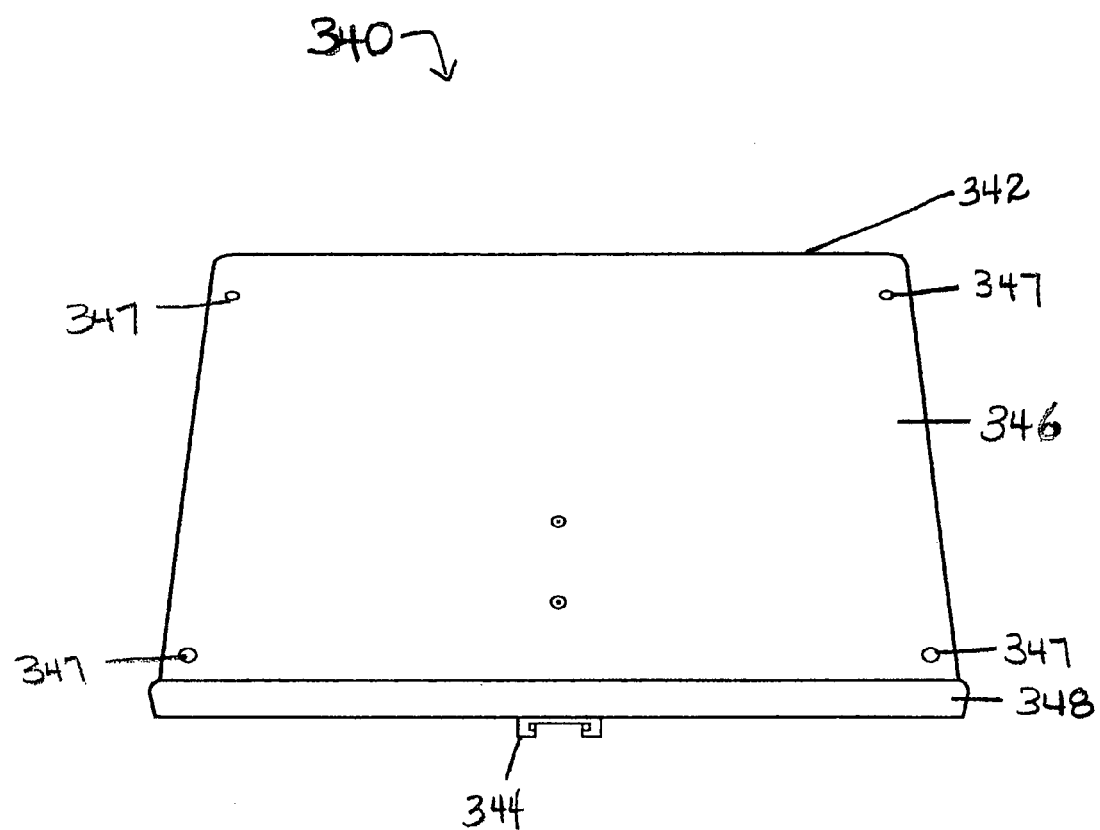
FIG. 20 is a perspective view of a computer tray.

A computer mounting module 340, for mounting a laptop computer or other similar electronic devices, as illustrated in FIG. 20, is another accessory which may be attached using a mounting bracket 250. In the exemplary embodiment illustrated, a first attachment part 344 is fixed to the back surface of a computer tray 342. An exemplary embodiment of a computer tray 342 includes a flat tray 346 with a lip 348 on one edge to prevent the computer mounted on the tray from slipping off of the computer tray 342. A computer may be more securely mounted to a computer tray 342 by means of tongue and hook tape applied to the flat tray 346 of a computer tray 342 and the back of a computer. Elastic bands may also be used in conjunction with holes 347 in the flat tray 346 of the computer tray 342, or other attachment means may be provided which are known or may become known for temporarily or permanently attaching a computer to a flat surface.

Figure 23:
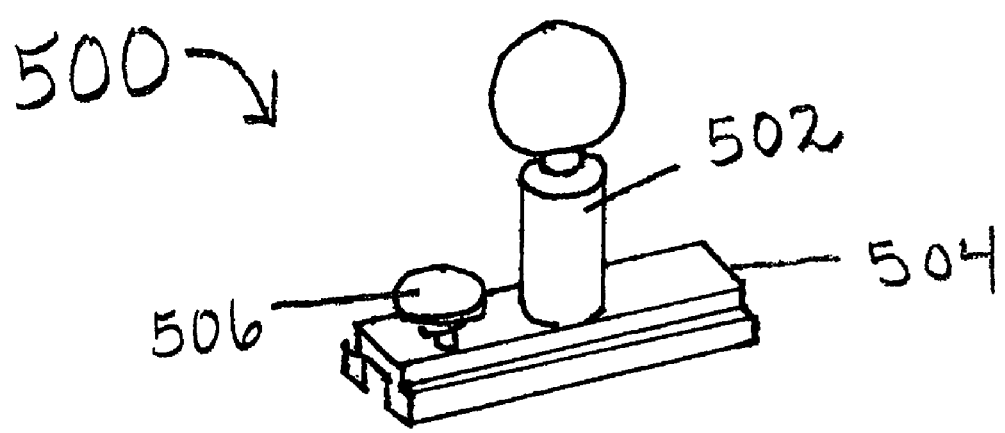
FIG. 23 is a view of a ball mount for a GPS device.
Figure 24:
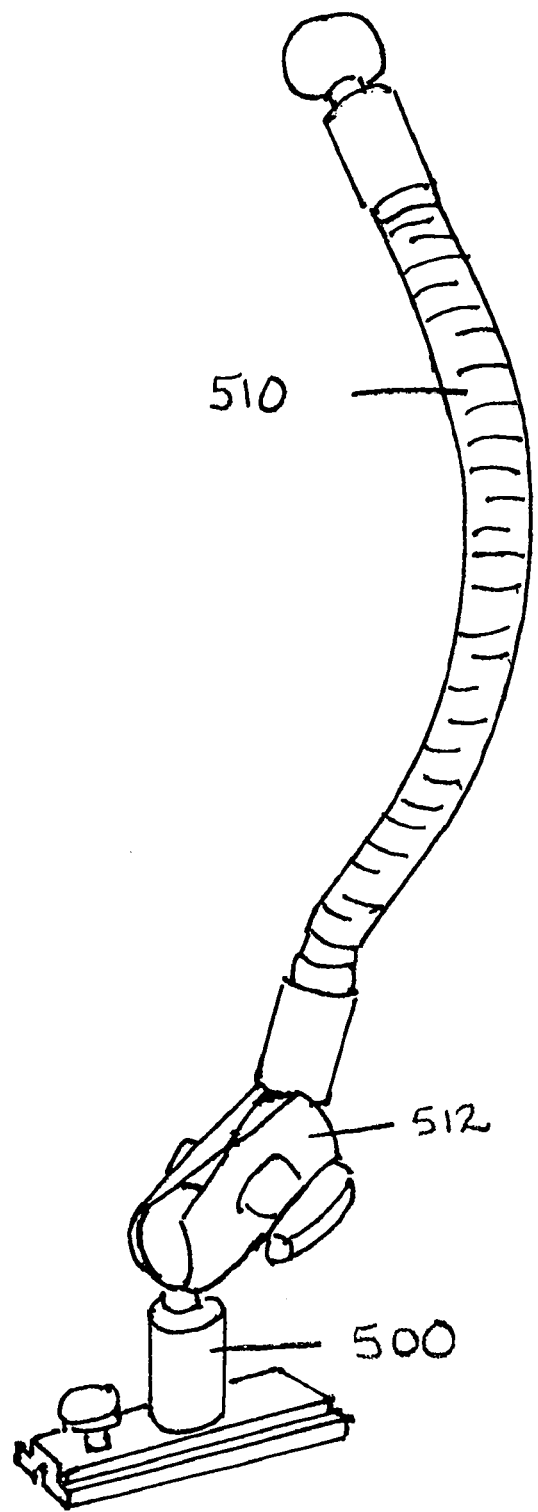
FIG. 24 is a view of a flexible mount for a GPS device attached to a ball mount.

A variety of brackets designed to hold or mount small items, particularly small electronic devices may also be adapted for use with an organizer console. FIGS. 23 and 24 show two such brackets. A ball type GPS mounting accessory 500, comprising a cylindrical stem topped by a ball, is illustrated in FIG. 23. The GPS mounting accessory comprises a commercially available mounting device 502 to which a second attachment part 504 has been attached. In the embodiment illustrated, a tension screw 506 at the top of second attachment part 504 fixes the mounting accessory 500 in relative position to a first attachment part on an organizer console 100 or an armrest module 200. In alternative embodiments, the mounting accessory 500 may be fixed in position by a stop near the top of the second attachment part 504, or may be attached and fixed in position by means of different attachment parts as have been previously discussed.

Figure 7:
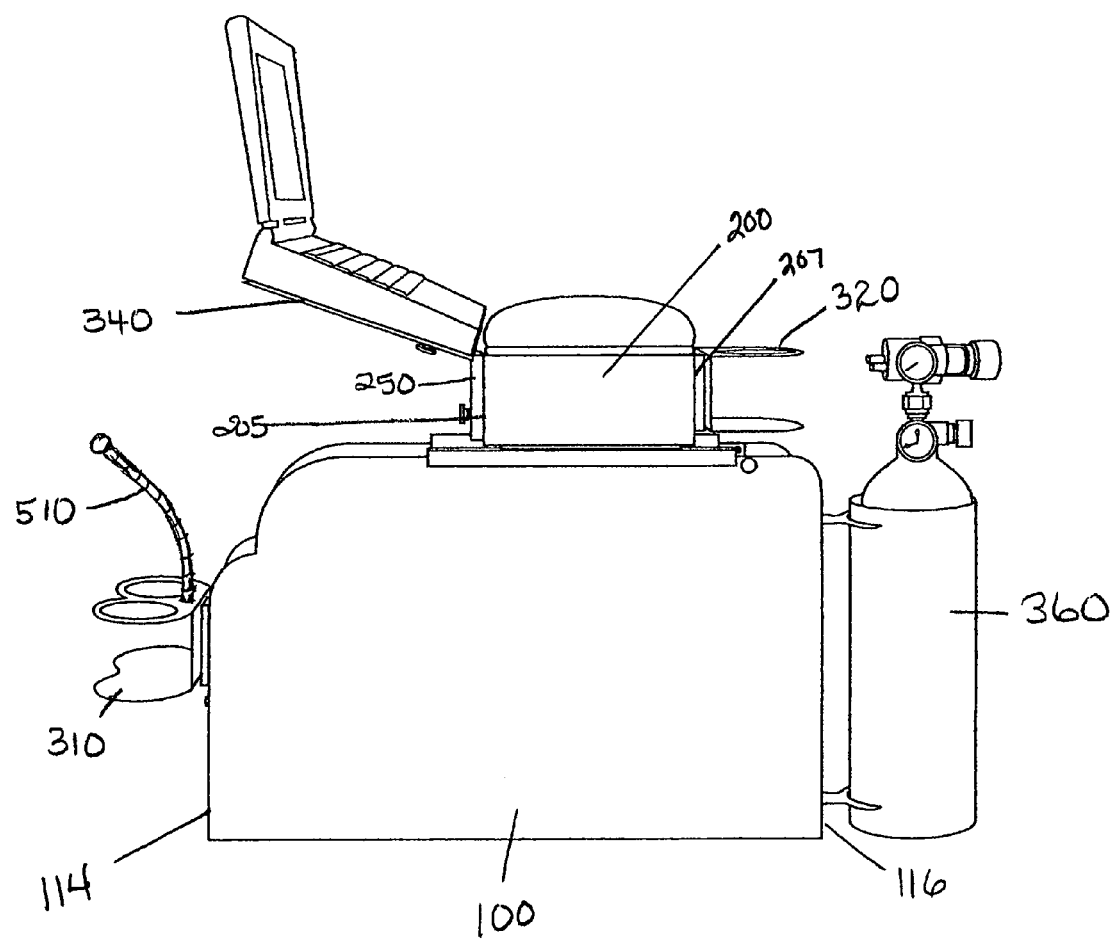
FIG. 7 is a perspective view of the console of FIG. 1 with an attached armrest, single cupholder, oxygen tank, double cupholder, computer tray, and flexible GPS mount.

A longer flexible GPS mounting accessory 510, comprising an elongated flexible stem with a ball attached at one or more ends of the flexible stem, is illustrated in FIG. 24. An exemplary embodiment of mounting accessory 510 may be attached to a ball type GPS mounting accessory 500 by means of a clamp 512, illustrated in FIG. 24. A clamp 512 may comprise two opposing curved plates centrally connected by a bolt. A mounting ball may be placed in each open of the clamp and the bolt tightened to connect the two balls together. Another exemplary embodiment of mounting accessory 510 may be adapted to be attached through a hole 313 or 323 in a cupholder module, as illustrated in FIG. 7. An exemplary attachment may include threading on one end of the flexible stem of the mounting accessory 510, onto which a bolt may be connected after the threaded end is passed through a hole 313, 323 in a cupholder module. In other exemplary embodiments, an embodiment of mounting accessory 510 may be adapted to be attached to an organizer console 100 or an armrest module 200 by similar means to those used for a ball mount type of GPS mounting accessory 500. It should be noted that the exemplary embodiments illustrated here are but two of many commercial mounting brackets for small electronic devices which may be fitted with an attachment part and used as an accessory in conjunction with an organizer console 100.

An easy and reliable means for pilots of small aircraft to organize and use information before, during, and after flight is essential because of the requirements typically imposed on pilots and the extreme dangers associated with pilot fatigue. Using exemplary embodiments of an organizer console, modules, and accessories described above or other similar consoles, modules, and accessories not explicitly described, a pilot may customize an organizer console 100 to accomplish the necessary goals of organization and ease of use. Several exemplary embodiments of customized organizer consoles 100 are illustrated in FIGS. 4 through 8. Initially, an individual might select the basic structure of the organizer console 100. If the aircraft has a floor structure adjacent to the pilot's seat which would raise the organizer console above the rest of the floor of the cockpit, a shorter organizer console 100 without a bottom compartment, such as is illustrated in FIG. 2 might be selected. If there are structures on the floor extending from the front of the cockpit toward the pilot's seat, an organizer console 100 with an angled front, such as is illustrated in FIG. 3, may be selected. If the distance between the seats in the cockpit is narrow, but the distance at the base of the seats is slightly wider, an organizer console with a wider base may be selected, such as is illustrated in FIG. 4. In the alternative, an organizer console 100 with a bottom compartment 140, and that does not have an angled front, as is illustrated in FIG. 1 may be selected.

Once the organizer console 100 with the appropriate dimensions is selected, the organizer console may be tailored to individual needs by affixing one or more internal walls 122, 124, 126 in the organizer console 100 at desired locations to create a plurality of upper compartments that are the desired sized. These internal walls 122, 124, 126 may be temporarily held in place using removable rivets, or mating protrusions and detents for example. If a permanent configuration is desired, permanent rivets, welds, or other more permanent means may be used to fix the internal walls 122, 124, 126 in the desired locations.

The organizer console 100 may then be further customized by selectively attaching modules to it. An armrest module 200 may be attached to the upper edges 136, 138 of the organizer console 100, as illustrated in FIGS. 4 through 8. The armrest module 200 may or may not include LEDs 372. If the armrest module 200 does not provide a sufficient support surface, an armrest extension 210 may be added, as illustrated in FIG. 6.

Additional modules may be attached to the first end 205 of the armrest module 200, to the first end 114 of an organizer console 100, or to the second end 116 of an organizer console 100. An exemplary configuration illustrated in FIG. 5 includes a wastebasket module 240 attached to the second end 116 of an organizer console 100, and a cupholder module 320 attached to the first end 114 of an organizer console 100. Another exemplary configuration, illustrated in FIG. 6, includes a clipboard module 270 attached to an armrest module 200 using a mounting bracket 250, an armrest extension 210, a flashlight accessory 290 clipped to the clipboard module 270, a cupholder module 320 attached to the first end 114 of an organizer console 100, and a CD box module attached to a second end 116 of an organizer module 100.

A further exemplary embodiment, illustrated in FIG. 7, includes an oxygen tank holder module 360 attached to the second end 116 of an organizer console 100, a cupholder 310 attached to the first end 114 of an organizer console 100, another cupholder 320 attached to the second end 207 of an armrest module 200, a computer mounting module 340 attached to the first end 205 of an armrest module 200 using a mounting bracket 250, and a flexible GPS mount 510 attached to the cupholder 310. FIG. 8 illustrates an organizer console 100 with an armrest module 370 which includes LEDs 372. Another exemplary embodiment, illustrated in FIG. 11 includes an armrest module 200 and an emergency battery module 220 in the first end 114 of an organizer console 100, with the front panel 230 of the emergency battery module 220 replacing the first access door 128.

As will be appreciated, there will be wide variety of configurations that will suit the individual needs of a wide variety of pilots. These further embodiments may be made by attaching a plurality of modules or accessories, including those described above and other similar modules or accessories, to an organizer console as described in exemplary fashion in this specification.

In addition to customizing an organizer console by varying the selected modules and accessories and the attachment sites for such selected modules and accessories, the relative position of most modules with respect to the console or other module to which the module or accessory is being attached made may be adjusted as well. For example, an armrest module may be moved forward or back along the upper edges of the organizer console. A clipboard module may be moved up or down along the first side of an armrest module, and the clipboard may be moved toward or away from an armrest module along the mounting bracket. Finally, the internal compartments may be customized by repositioning, or omitting the internal walls which control the size and location of such compartments.

Once the structural configuration of the organizer console has been set, the organizer console may be loaded. Because the organizer console is not fixed to the aircraft, the console may be loaded at a site other than the cockpit of a small aircraft. This permits the pilot to assemble and verify the contents of the console at his or her leisure, and to ensure that none of the supplies have been removed or depleted. In addition, assembly can be accomplished in a less restricted space than the confines of the aircraft cockpit. Various configurations of the organizer console and of the assembled items can be tested, reconfigured, and tested again until a satisfactory arrangement is reached. Once assembled, the organizer console can be carried from aircraft to aircraft, permitting a level of familiarity and certainty not normally present when a pilot occasionally flies less familiar aircraft. An assembly which is easy to use and familiar will help minimize pilot fatigue, whether used in the pilot's familiar aircraft or in a less familiar one.

Thus the organizer console, modules, and accessories achieve the above stated objectives, eliminate difficulties encountered in the use of prior methods, solve problems and attain the desirable results described herein.

In the foregoing description certain terms have been used for brevity, clarity, and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function and shall not be limited to the structures shown herein or mere equivalents thereof.

Having described the features, discoveries and the principles of the invention, the manner in which it is constructed and operated and the advantages and useful results attained; the new and useful structures, devices, elements, arrangements, parts, combinations, systems, equipment, operations, methods and relationships are set forth in the appended claims.

I claim:

1. The apparatus comprising
an organizer console for an airplane cockpit comprising
a box-like structure having first and second opposing sides, first and second opposing ends and a bottom side adjacent the first and second sides and the second end, and an open top, with each side having an internal and an external face and
at least one attachment part that is affixed to the external face of at least one of the sides and ends,
at least one of an accessory module and a mounting bracket, wherein the at least one of an accessory module and a mounting bracket has an attachment part adapted to releasably mate with at least one of the at least one attachment parts affixed to the organizer console.

2. The apparatus of claim 1 wherein said organizer console further comprises at least one internal wall between the first and second ends which extends from the first side to the second side.

3. The apparatus of claim 2 wherein at least one of the at least one internal walls is removably attached to the first and second sides.

4. The apparatus of claim 3 wherein said first and second sides of said organizer console include a plurality of spaced vertical rows of holes adapted to accept removable rivets, wherein the spaced vertical rows of holes may be used with removable rivets to selectively position at least one of the at least one removably attached internal walls.

5. The apparatus of claim 1 wherein said structure further includes an internal floor positioned between the bottom side and the open top, wherein the internal floor creates a bottom compartment.

6. The apparatus of claim 5 wherein at least one of the first and second ends includes a hinged and latchable access door to the bottom compartment.

7. The apparatus of claim 1 wherein
the first and second sides each have an upper edge wherein a portion of the upper edge which is adjacent the first end has a rounded step shape.

8. The apparatus of claim 6 wherein
the first and second sides each have a bottom edge, wherein each bottom edge has a portion adjacent the second end that is horizontal and a portion that is adjacent the first end which angles toward the first end and the internal floor,
wherein the bottom side is joined to the horizontal portion of the bottom edges and extends from the first side to the second side of the organizer console, and
wherein the organizer console further comprises a recessed wall, which is vertical when the organizer is in an upright position, which comprises a first end to the bottom compartment.

9. The apparatus of claim 1 wherein
the first and second sides include bottom edges, at least a portion of which are horizontal when the organizer console is in an upright position, and
wherein the bottom side is elevated above the bottom edges of the first and second sides.

10. The apparatus of claim 1 wherein the apparatus further comprises the cockpit of an aircraft.

11. The apparatus of claim 1 wherein the first and second sides have upper edges and
wherein the organizer console further comprises an armrest module said module comprising
a box like container having a bottom, a top, and first and second ends, wherein the top comprises a hinged lid,
at least two armrest module attachment parts each comprising a rail having an upper surface and a lower surface and a hinge portion, wherein the lower surface comprises an inverted U-shaped channel adapted to rest on the upper edges of the first and second sides of the organizer console, wherein the upper surface comprises a track, and wherein the rails are attached at the hinge portion to the first and second sides of the organizer console respectively are adapted to rotate the armrest module between an open and a closed position relative to the organizer console,
at least two rails affixed to the bottom of the container, each of which is adapted to mate with the track in an upper surface of the armrest module attachment part, wherein each rail is moveable within the corresponding track permitting the armrest module to be selectively positioned relative to the first and second ends of the console when armrest module is in the closed position.

12. The apparatus in claim 11 wherein the armrest module further comprises at least one tension screw passing through the bottom of the container adjacent at least one of the tracks, wherein the tension screw is adapted to increase or decrease the resistance to movement of the armrest module with respect to the organizer console.

13. The apparatus in claim 11 wherein the mating cross sections of the tracks and the rails have shapes approximating a keyhole.

14. The apparatus of claim 11 wherein the armrest module further comprises at least one attachment part affixed to at least one of the ends of the container.

15. The apparatus of claim 14 wherein at least one of the at least one attachment parts comprises a T-shaped track.

16. The apparatus of claim 5 wherein the first and second sides include corresponding steps, wherein the organizer console includes a portion above the steps and a portion below the steps wherein the portion of the organizer console below the steps comprises the bottom compartment, and wherein the bottom compartment is wider than the portion of the organizer console above the stepped portion.

17. The apparatus of claim 5
wherein the first and second sides of the organizer include lower edges and wherein the lower edges include a horizontal portion, an upward slope, and a step
wherein the bottom side is characterized by a contour and wherein the contour conforms to the lower edges of the first and second sides, creating a first, second, and third portions of the organizer console, and
wherein the bottom compartment corresponds to a first portion of the organizer console, and
wherein the portions of the bottom side of the organizer console are adapted to rest on the corresponding portions of a floor of an airplane cockpit.

18. The apparatus of claim 1 wherein at least one of the at least one attachment parts is a track characterized by a T-shaped cross section.

19. The apparatus of claim 1 wherein at least one of the at least one of an accessory module and mounting bracket comprises at least one of a cupholder, an LED emergency light, a wastebasket, an oxygen tank mount, a fire extinguisher mount, and a GPS mount.

20. The apparatus of claim 14 wherein the organizer console further comprises at least one mounting bracket and wherein the at least one mounting bracket is characterized by having a first and second arm separated by an angle greater than or equal to ninety degrees and wherein each of the first and second arms include an attachment part that is adapted to mate with at least one of the at least one attachment parts on the organizer console or on an accessory module.

21. The apparatus of claim 5 wherein the bottom compartment includes an emergency battery module wherein the emergency battery module comprises
a tray adapted to hold and move a battery into and out of the bottom compartment
a panel adjacent to the tray and separated from the tray by an angle of approximately ninety degrees, wherein the panel is operative to close the bottom compartment when the emergency battery module is in the bottom compartment
a battery
an access port that is operatively connected to the battery.

22. The apparatus of claim 21 wherein the access port is power jack of the cigarette lighter type.

23. The apparatus of claim 20 wherein at least one of the at least one attachment parts on the armrest module includes a track having a T-shaped cross section, and wherein the at least one mounting bracket includes a rail having a T-shaped cross section adapted to mate with the at least one attachment part on the armrest module, and wherein the apparatus further comprises an accessory module attached to at least one of the at least one mounting bracket, wherein the accessory module is selected from the group of a clipboard and a computer laptop tray, wherein the accessory module attached to the at least one mounting bracket includes an attachment part that is adapted to mate with the attachment part on the at least one mounting bracket.

24. The apparatus of claim 20 wherein the organizer console further comprises:

at least one of a computer laptop tray, a clipboard, and an armrest extension attached to at least one of the at least one mounting brackets.

25. A method for organizing flight accessories comprising
selecting an organizer console having an interior cavity wherein the organizer console has dimensions adapted to fit between a pilot's seat and an adjacent seat in a cockpit of an airplane,
customizing said organizer console by attaching at least one of an accessory module and a mounting bracket to the organizer console using at least one track and rail attachment part.

26. The method of claim 25 further comprising attaching an armrest module to the console using hinged rails wherein the armrest module is operative to rotate between a closed position and an open position, wherein in the open position the interior cavity of the organizer console is exposed.

27. The method of claim 26 wherein the armrest module has an exterior surface and wherein the exterior surface includes at least one LED light.

28. The method of claim 26 further comprising attaching at least one of an accessory module and a mounting bracket to the armrest module using at least one track and rail attachment.

29. The method of claim 28 wherein
at least one of the at least one of an accessory module and mounting bracket attached to the armrest module is a mounting bracket, and
wherein the method further comprises attaching at least one accessory module to the mounting bracket using at least one track and rail attachment part.

30. The method of claim 29 wherein the at least one accessory module attached to the mounting bracket includes at least one of a computer laptop tray, a clipboard, and an armrest extension.

31. The method of claim 28 wherein at least one of an accessory module and a mounting bracket is an accessory module comprising an armrest extension which includes an integrated mounting bracket.

32. The method of claim 25 wherein at least one of the at least one of an accessory module and a mounting bracket is an accessory module and is selected from the group comprising a cupholder, an LED emergency light, a wastebasket, an oxygen tank mount, a fire extinguisher mount, and a GPS mount.

33. The method of claim 25 further comprising partitioning the interior cavity into at least two compartments by affixing at least one interior wall to the organizing console.

34. The method of claim 25 wherein the selecting step further includes selecting an organizer console having a bottom contour adapted to conform to a floor of a cockpit of a selected airplane.

35. The method of claim 25 wherein the selecting step further includes selecting an organizer console having a bottom compartment.

36. The method of claim 35 wherein the bottom compartment includes at least one latchable access door.

37. The method of claim 35 wherein the bottom compartment includes an emergency battery module comprising a battery, a drawer, and an access port, wherein the drawer includes a at least one panel adapted to close at least one end of the bottom compartment and wherein the access port is adapted to provide operative access to the battery.

* * * * *